(12) United States Patent
Aramaki et al.

(10) Patent No.: US 7,067,577 B2
(45) Date of Patent: Jun. 27, 2006

(54) APATITE-REINFORCED RESIN COMPOSITION

(75) Inventors: Masaaki Aramaki, Chiba (JP); Kenya Sonobe, Chiba (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 405 days.

(21) Appl. No.: 10/399,281

(22) PCT Filed: Oct. 4, 2001

(86) PCT No.: PCT/JP01/08760

§ 371 (c)(1),
(2), (4) Date: Apr. 16, 2003

(87) PCT Pub. No.: WO02/33004

PCT Pub. Date: Apr. 25, 2002

(65) Prior Publication Data

US 2004/0034141 A1  Feb. 19, 2004

(30) Foreign Application Priority Data

Oct. 16, 2000 (JP) ............................. 2000-314931
Mar. 30, 2001 (JP) ............................. 2001-098880

(51) Int. Cl.
*C08J 3/00* (2006.01)
*C08K 3/32* (2006.01)
*C08L 7/00* (2006.01)
*C08L 25/00* (2006.01)
*C08L 31/00* (2006.01)

(52) U.S. Cl. ...................... 524/417; 524/318; 524/322; 524/415; 524/543; 524/556; 524/577; 524/552; 524/575.5; 524/571; 524/606; 524/609; 524/601; 524/611; 524/612; 524/729; 523/113; 523/115; 523/307

(58) Field of Classification Search ................ 524/415, 524/417, 318, 322, 543, 556, 577, 552, 575.5, 524/571, 606, 609, 601, 611, 612, 729; 523/113, 523/115, 307
See application file for complete search history.

(56) References Cited

U.S. PATENT DOCUMENTS 5,092,890 A * 3/1992 Pohlemann et al. ......... 424/423
6,013,591 A * 1/2000 Ying et al. ..................... 501/1
6,506,826 B1 * 1/2003 Aramaki et al. ............ 524/415

FOREIGN PATENT DOCUMENTS

JP  2000-119495 A  4/2000
JP  2001-89114 A   4/2001

* cited by examiner

*Primary Examiner*—Patrick D. Niland
(74) *Attorney, Agent, or Firm*—Birch, Stewart, Kolasch & Birch, LLP

(57) ABSTRACT

The present invention relates to a resin composition comprising a resin and apatite, wherein referring to the particulate form of said apatite present in the resin composition thus obtained, the apatite is present in a particulate form having an average diameter or average thickness (d) of not greater than 100 nm and an average aspect ratio (L/D) of not smaller than 5 as defined by the ratio of the average length (L) to said average diameter or average thickness (d).

21 Claims, No Drawings

APATITE-REINFORCED RESIN COMPOSITION

This application is the national phase under 35 U.S.C. § 371 of PCT International Application No. PCT/JP01/08760 which has an International filing date of Oct. 4, 2001, which designated the United States of America.

TECHNICAL FIELD

The present invention relates to a resin composition having a high strength, rigidity and heat resistance and excellent toughness, percent weld strength retention, dimensional properties, external surface appearance and reworkability comprising a resin and finely divided apatite having a high aspect ratio which is suitable for various industrial materials such as mechanical industrial parts and electrical and electronic parts.

BACKGROUND ART

It has heretofore been widely practiced to mix an inorganic filler with a resin for the purpose of improving or enhancing the characteristics of resin materials. For example, a method has been proposed which comprises mixing various inorganic fillers such as inorganic fibrous filler, e.g., glass fiber, carbon fiber, inorganic particulate material, e.g., talc, kaolin, mica, calcium carbonate, wollastonite, and layer structure compound, e.g., mica, montmorillonite, swelling fluoromica with a resin. Some of these materials have been used as various parts in the art of general-purpose consumers' products such as packaging material and vessel, automobile, electricity, electronics, machinery, industry, office machine, space, aviation, etc.

These related art techniques are advantageous in that the resulting molded products exhibit some improvement in strength and rigidity but are disadvantageous in that the products mixed with an inorganic fibrous filler such as glass fiber and carbon fiber exhibit an increased specific gravity, deteriorated external surface appearance or surface smoothness or lowered toughness. These related art techniques are also disadvantageous in that abrasion occurs with the cylinder, screw, mold, etc. in the extruder or molding machine during extrusion or molding. These related art techniques are further disadvantageous in that when subjected to recycling or reworking as required due to the recent growing environmental demand, the resulting products exhibits a drastic deterioration in physical properties such as strength and thus cannot be reused. Further, when a layer structure compound such as mica, montmorillonite and swelling fluoromica is used, the resulting molded products exhibit a drastically reduced weld strength, occasionally making it difficult to use as industrial materials.

Therefore, resin compositions having well-balanced physical properties, high strength, rigidity and heat resistance and excellent toughness, retention of weld strength, dimensional characteristics, external surface appearance and reworkability suitable for various machine industrial parts and industrial materials such as electrical and electronic parts which are different from the related art techniques have been industrially desired.

In order to solve the aforementioned problems, the present inventors proposed a resin composition made of a polyamide resin and finely divided apatite and found a polyamide which exhibits an enhanced rigidity and strength without impairing its toughness as disclosed in WO2000-11099. However, as a result of studies by the present inventors, it was found that since the finely divided apatite is spherical, the resulting polyamide leaves something to be desired in application to various parts such as automobile parts, electric and electronic parts and industrial machine parts.

On the other hand, as a composition made of a resin and apatite there has been disclosed a polyester composition made of a polyester resin and hydroxyapatite having an average primary particle diameter of from 5 to 200 nm, an average secondary particle diameter of from 0.1 to 10 μm and a secondary particle diameter relative standard deviation of not greater than 0.95 in JP-A-2000-119495. Further, a composition made of a polymer resin and fibrous hydroxyapatite having an average fiber diameter of from 5 to 20 μm and an average fiber length of from 100 μm to 5 mm is disclosed in JP-A-63-132810. Referring to the characteristics of the apatites taught therein, the former is finely divided but has no reference to the average aspect ratio of apatite while the latter has a high aspect ratio but a great average diameter.

The present inventors' studies show that the more applicable to industrial parts these compositions are, the more insufficient are their strength, rigidity and heat resistance and the more are ill-balanced their toughness, retention of weld strength, external surface appearance and reworkability.

Referring to finely divided acicular apatite having a high aspect ratio, Masahiro Yoshimura et al. disclose a method which comprises subjecting a low crystallinity apatite with additives such as ethylenediaminetetraacetic acid added thereto to hydrothermal synthesis in Journal of The Chemical Society of Japan, 1991, (10), pp. 1,402–1,407. However, the present inventors' studies show that this method has a remarkably low yield and thus can be difficultly used on an industrial basis.

Therefore, in the related art techniques, no resin compositions made of a resin and finely divided acicular apatite having a high aspect ratio are known, and their characteristics have been unknown.

An object of the present invention is to provide a resin composition comprising a resin and apatite excellent in strength, rigidity and heat resistance as well as in percent weld strength retention, dimensional properties, external surface appearance and reworkability, wherein referring to the particulate form of said apatite present in the resin composition thus obtained, the apatite is present in a particulate form having an average diameter or average thickness (d) of not greater than 100 nm and an average aspect ratio (L/D) of not smaller than 5 as defined by the ratio of the average length (L) to said average diameter or average thickness (d).

DISCLOSURE OF THE INVENTION

The present inventors made extensive studies of solution to the aforementioned problems. As a result, it was found that the aforementioned problems can be solved by a resin composition comprising a resin and apatite having a specific shape and size. The present invention has thus been worked out.

In other words, the present invention provides the followings:

1. An apatite-reinforced resin composition comprising a resin and apatite, wherein said apatite is present in said resin composition thus obtained in a particulate form having an average diameter or average thickness (d) of not greater than 100 nm and an average aspect ratio (L/d) of not smaller than 5 as defined by the ratio of the average length (L) to said average diameter or average thickness (d).

2. The apatite-reinforced resin composition according to item 1 above, wherein the resin is at least one thermoplastic resin selected from the group consisting of polyamide resin, polyphenylene ether resin, polyoxymethylene resin, aliphatic polyester resin, aromatic polyester resin, aromatic polycarbonate resin, polyphenylene sulfide resin, polyolefin resin, styrene resin, acryl resin and rubber.

3. The apatite-reinforced resin composition according to item 1 or 2 above, wherein the molar ratio (Ca+X)/P of phosphorus (P) and calcium (Ca) plus metals (X) other than calcium, constituting said apatite present in said resin composition is from 1.20 to 1.80.

4. The apatite-reinforced resin composition according to item 3 above, wherein the molar ratio Ca/(Ca+X) of calcium (Ca) plus metals (X) other calcium and calcium (Ca), constituting said apatite present in said resin composition is from 0.70 to 1.00 and the molar ratio (Ca+X)/F of fluorine (F) and calcium (Ca) plus metals (X) other calcium, constituting said apatite present in said resin composition is from 5.0 to 1,000.

5. The apatite-reinforced resin composition according to item 4 above, wherein the apatite is obtained by mixing (A) a calcium compound having a phosphorus to calcium molar ratio (P/Ca) of not greater than 0.1 and (B) a phosphoric acid or phosphorous acid ester compound with (C) water or a solvent comprising at least one selected from the group consisting of hydrophilic organic solvents to prepare a raw material solution, and then subjecting said raw material solution to hydrothermal synthesis at 120° C. or higher under pressure.

6. The apatite-reinforced resin composition according to item 4 above, wherein the apatite is obtained by mixing a raw material comprising (D) a mixture of either or both of a calcium phosphate compound and other phosphorus compounds and optionally a calcium compound (except calcium phosphate), (E) a metal compound comprising a metal other than calcium and (F) a fluorine compound, with (C) water or a solvent comprising at least one selected from the group consisting of hydrophilic organic solvents to prepare a raw material solution, and then subjecting said raw material solution to hydrothermal synthesis.

7. The apatite-reinforced resin composition according to item 3 above, wherein the molar ratio Ca/(Ca+X) of calcium (Ca) plus metals (X) other than calcium and calcium (Ca), constituting said apatite present in said resin composition is from 0.80 to 1.00.

8. The apatite-reinforced resin composition according to item 7 above, wherein the apatite is obtained by subjecting octacalcium phosphate to heat treatment at 40° C. to 400° C.

9. A process for the production of an apatite-reinforced resin composition comprising a resin and apatite, which process comprises mixing a resin with apatite having an average diameter or average thickness (d) of not greater than 100 nm and an average aspect ratio (L/d) of not smaller than 5 as defined by the ratio of the average length (L) to said average diameter or average thickness (d).

10. A process for the production of an apatite-reinforced resin composition comprising a resin and apatite, which process comprises mixing a resin raw material with apatite having an average diameter or average thickness (d) of not greater than 100 nm and an average aspect ratio (L/d) of not smaller than 5 as defined by the ratio of the average length (L) to said average diameter or average thickness (d), and then subjecting the mixture to polymerization.

11. The process for the production of an apatite-reinforced resin composition according to item 9 or 10 above, wherein the apatite to be mixed is obtained by mixing (A) a calcium compound having a phosphorus to calcium molar ratio (P/Ca) of not greater than 0.1 and (B) a phosphoric or phosphorous acid ester compound with (C) water or a solvent comprising at least one selected from the group consisting of hydrophilic organic solvents to prepare a raw material solution, and then subjecting said raw material solution to hydrothermal synthesis at 120° C. or higher under pressure.

12. The process for the production of an apatite-reinforced resin composition according to item 9 or 10 above, wherein the apatite to be mixed is obtained by mixing a raw material comprising (D) a mixture of either or both of a calcium phosphate compound and other phosphorus compounds and optionally a calcium compound (except calcium phosphate), (E) a metal compound comprising a metal other than calcium and (F) a fluorine compound, with (C) water or a solvent comprising at least one selected from the group consisting of hydrophilic organic solvents to prepare a raw material solution, and then subjecting said raw material solution to hydrothermal synthesis.

13. The process for the production of an apatite-reinforced resin composition according to item 9 or 10 above, wherein the apatite to be mixed is obtained by subjecting octacalcium phosphate to heat treatment at 40° C. to 400° C.

14. A process for the production of an apatite-reinforced resin composition of item 1 above, which comprises mixing a resin with a raw material solution obtained by mixing (A) a calcium compound having a phosphorus to calcium molar ratio (P/Ca) of not greater than 0.1 and (B) a phosphoric acid or phosphorous acid ester compound with (C) water or a solvent comprising at least one selected from the group consisting of hydrophilic organic solvents, and then subjecting the mixture to heat treatment while the resin is in molten state.

15. A process for the production of an apatite-reinforced resin composition of item 1 above, which comprises subjecting a resin and a raw material solution obtained by mixing (D) a mixture of either or both of a calcium phosphate compound and other phosphorus compounds and optionally a calcium compound (except calcium phosphate), (E) a metal compound comprising a metal other than calcium and (F) a fluorine compound, with (C) water or a solvent comprising at least one selected from the group consisting of hydrophilic organic solvents, to heat treatment while the resin is in molten state.

16. A process for the production of an apatite-reinforced resin composition of item 1 above, which comprises mixing a resin with octacalcium phosphate, and then subjecting the mixture to heat treatment at 40° C. to 400° C.

17. A process for the production of an apatite-reinforced resin composition of item 1 above, which comprises mixing a raw resin material with a raw material solution obtained by mixing (A) a calcium compound having a phosphorus to calcium molar ratio (P/Ca) of not greater than 0.1 and (B) a phosphoric acid or phosphorous acid ester compound with (C) water or a solvent comprising at least one selected from the group consisting of hydrophilic organic solvents, and then effecting polymerization of the resin and hydrothermal synthesis of apatite at the same time.

18. A process for the production of an apatite-reinforced resin composition of item 1 above, which comprises mixing a raw resin material with a raw material solution obtained by mixing (D) a mixture of either or both of a calcium phosphate compound and other phosphorus compounds and optionally a calcium compound (except calcium phosphate), (E) a metal compound comprising a metal other than calcium and (F) a fluorine compound with (C) water or a solvent comprising at least one selected from the group consisting of hydrophilic organic solvents, and then effecting polymerization of the resin and hydrothermal synthesis of apatite at the same time.

19. A process for the production of an apatite-reinforced resin composition of item 1 above, which comprises mixing a raw resin material with octacalcium phosphate, and then effecting polymerization of the resin and synthesis of apatite at 40° C. to 400° C. at the same time.

20. The process for the production of an apatite-reinforced resin composition according to item 16 above, wherein the octacalcium phosphate has an average thickness (d) of not greater than 100 nm and an average aspect ratio (L/d) of not smaller than 5 as defined by the ratio of the average length (L) to said average thickness (d).

21. The process for the production of an apatite-reinforced resin composition according to item 19 above, wherein the octacalcium phosphate has an average thickness (d) of not greater than 100 nm and an average aspect ratio (L/d) of not smaller than 5 as defined by the ratio of the average length (L) to said average thickness (d).

BEST MODE FOR CARRYING OUT THE INVENTION

The present invention will be further described hereinafter.

The present invention concerns a resin composition comprising a resin and apatite, wherein referring to the particulate form of said apatite present in the resin composition thus obtained, the apatite is present in a particulate form having an average diameter or average thickness (d) of not greater than 100 nm and an average aspect ratio (L/D) of not smaller than 5 as defined by the ratio of the average length (L) to said average diameter or average thickness (d).

The resin which is preferably used in the present invention is not specifically limited, but thermoplastic resins or rubbers and thermosetting resins may be exemplified as preferred resins.

Examples of the thermoplastic resins include condensed resins such as polyamide resin, polyphenylene ether resin, polyoxymethylene resin, aliphatic polyester resin, aromatic polyester resin, aromatic polycarbonate resin, polyphenylene sulfide resin, polyolefin resin, styrene resin, acryl resin, aramide resin and polyimide resin, polyether resins such as polysulfone, polyether sulfone and polyether ketone, halogen-containing vinyl compound resins such as polyvinyl chloride, polyvinylidene chloride, polyvinyl fluoride and polyvinylidene fluoride, rubbers, etc. Examples of the aliphatic polyester resins include polylacetic acids and polyglycolic acids, which are known as biodegradable polymers.

Besides these resins, thermoplastic resins such as phenol resin, urea resin, melamine resin, epoxy resin and silicone resin, etc. may be used. These resins may be used singly or in combination of two or more thereof.

In the present invention, among these resins, at least one thermoplastic resin selected from polyamide resin, polyphenylene ether resin, polyoxymethylene resin, aliphatic polyester resin, aromatic polyester resin, aromatic polycarbonate resin, polyphenylene sulfide resin, polyolefin resin, styrene resin, acryl resin and rubbers is more preferably used.

Apatite is a compound composed of calcium and phosphorus which is known also as a component of human bone and is normally known to have calcium and/or phosphorus atom present therein in an amount beyond or below the stoichiometric value. Therefore, apatite may be in various forms such as sphere, hexagonal prism, needle and tablet. In the present invention, the resin composition is made of apatite having an average diameter or average thickness of not greater than 100 nm and an average aspect ratio of not smaller than 5 having a remarkable effect of reinforcing resin, i.e., acicular or tabular apatite and resin.

In the present invention, acicular apatite is not specifically limited so far as it has a form such as needle, column and hexagonal prism, an average diameter of not greater than 100 nm, preferably not greater than 75 nm, most preferably not greater than 50 nm, and an average aspect ratio of not smaller than 5, preferably not smaller than 10, more preferably not smaller than 15, most preferably not smaller than 20. Tabular apatite is not specifically limited so far as it has a form such as tablet, disc, strip and layer structure, an average thickness of not greater than 100 nm, preferably not greater than 75 nm, most preferably not greater than 50, and an average aspect ratio of not smaller than 5, preferably not smaller than 20, more preferably not smaller than 25, most preferably not smaller than 30. In the present invention, the length of the longest axis (long side) in the apatite form is defined to be "length L", and the length of the shortest axis as opposed thereto is defined to be "diameter d" in the case of acicular form or "thickness d" in the case of tabular form.

In the present invention, the average length, average diameter, average thickness and average aspect ratio are defined by the following:

Average length $L=\Sigma Li^2 Ni/\Sigma LiNi$

Average diameter or average thickness $d=\Sigma di^2 Ni/\Sigma diNi$

Average aspect ratio $L/d=(\Sigma Li^2 Ni/\Sigma LiNi)/(\Sigma di^2 Ni/\Sigma diNi)$ supposing that apatite particles having a length of Li and a diameter or thickness di are present by the number of Ni per unit volume.

The acicular or tabular apatite to be used in the present invention will be further described hereinafter.

In general, apatite is represented by the following general formula (I).

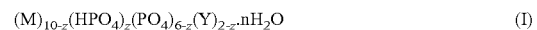

$(M)_{10-z}(HPO_4)_z(PO_4)_{6-z}(Y)_{2-z} \cdot nH_2O$ (I)

wherein z represents a number of from 0 to 2; n represents a number of from 0 to 16; (M) represents a metal element; and (Y) represents an anion or anionic compound.

The aforementioned metal element (M) is preferably calcium (Ca) from the standpoint of stability of crystal but may be a mixture of calcium and metal elements (x) other than calcium such as elements of the groups I, II (except calcium), III, IV, V, VI, VII, VIII, XI, XII and XIII, tin and lead. Particularly preferred examples of the metal elements other than calcium include magnesium, strontium, barium, lead, nickel, aluminum, copper, iron or mixture of two or more thereof.

Examples of the anion or anionic compound represented by (Y) include hydroxyl ion (OH−), fluorine ion (F−), chlorine ion (Cl−), etc. These anionic elements or anionic compounds may be used singly or combination of two or more thereof. Further, apatite may be carbonic acid-containing apatite obtained by substituting some of hydrophosphate ions (HPO$_4^{2-}$), phosphate ion (PO$_4^{3-}$) or (Y) in the aforementioned general formula by carbonate ion (CO$_3^{2-}$).

Apatite to be used in the present invention is acicular or tabular apatite having the composition represented by the aforementioned general formula and having an average diameter or average thickness (d) of not greater than 100 nm and an average aspect ratio (L/d) of not smaller than 5 as defined by the ratio of the average length (L) to said average diameter or average thickness (d) but may be a metallic or phosphorus-free apatite wherein the stoichiometric ratio of metal (M) to phosphorus (P), i.e., (Ca+X)/P (with the proviso that X is a metal other than calcium) deviates from 1.67. Further, in order that the apatite is a finer apatite having a high aspect ratio, (Ca+X)/P is preferably from 1.20 to 1.80, more preferably from 1.25 to 1.75, most preferably from 1.30 to 1.70.

Moreover, in the case where the apatite to be used is acicular, the proportion of calcium in the metal elements (M), i.e., molar ratio Ca/(Ca+X) of calcium (Ca) plus metal (X) other than calcium and calcium (Ca) is preferably from 0.70 to 1.00, more preferably from 0.75 to 0.98, most preferably from 0.80 to 0.95. Further, (Y) in the aforementioned general formula preferably includes fluorine ion. In this case, the molar ratio (Ca+X)/F of fluorine (F) and calcium (Ca) plus metal (X) other than calcium is preferably from 5.0 to 1,000, more preferably from 5.0 to 100, most preferably from 5.0 to 50. When this molar ratio deviates from the above-mentioned range, a tendency is given that a finer acicular apatite having a high aspect ratio can be hardly obtained.

Furthermore, in the case where the apatite to be used in the invention is tabular, the molar ration Ca/(Ca+X) of calcium (Ca) plus metal (X) other than calcium and calcium (Ca) is preferably from 0.80 to 1.00, more preferably from 0.90 to 1.00, most preferably from 0.95 to 1.00. When this molar ratio deviates from the above-mentioned range, a tendency is given that a finer tabular apatite having a high aspect ratio can be hardly obtained.

The quantitative determination of metal elements such as calcium and phosphorus in the apatite to be used in the present invention can be carried out by the use of a high frequency inductively coupled plasma (ICP) emission spectroscope analysis.

In some detail, referring to calcium as a metal element, 0.5 g of the resin composition of the present invention is measured out in a platinum plate, and then carbonized in a 500° C. electric furnace. After cooling, to the material thus carbonized are then added 5 ml of hydrochloric acid and 5 ml of purified water. The mixture is then boiled over a heater to make solution. The solution is then again cooled. To the solution is then added purified water to make 500 ml. The solution is then subjected to quantitative determination by a high frequency inductively coupled plasma (ICP) emission spectroscope analysis at a wavelength of 317.933 nm. Other metal elements can be quantitatively determined in the same manner as mentioned above by selecting their characteristic wavelengths.

For the quantitative determination of phosphorus, 0.5 g of the resin composition of the present invention is measured out. To the material is then added 20 ml of concentrated sulfuric acid. The specimen is then subjected to wet decomposition over a heater. After cooling, to the specimen is then added 5 ml of hydrogen peroxide. The specimen is then heated and concentrated over a heater until the total amount thereof reaches 2 to 3 ml. The specimen is then again cooled. To the specimen is then added purified water to make 500 ml. The specimen is then subjected to quantitative determination by a high frequency inductively coupled plasma (ICP) emission spectroscope analysis at a wavelength of 213.618 nm. From the results of quantitative determination thus obtained can be calculated the molar ratio of metal elements such as calcium to phosphorus.

The process for the production of acicular apatite having an average diameter of not greater than 100 nm and an average aspect ratio (L/d) of not smaller than 5 among the apatite products to be used in the present invention is not specifically limited, but, from the standpoint of ability to obtain in a high yield, is preferably the following:

(Production process-1) A process for the production of acicularly particulate apatite which comprises mixing (A) a calcium compound having a phosphorus to calcium molar ratio (P/Ca) of not greater than 0.1 and (B) a phosphoric or phosphorous acid ester compound with (C) water or a solvent comprising at least one selected from the group consisting of hydrophilic organic solvents to prepare a raw material solution, and then subjecting said raw material solution to hydrothermal synthesis at 120° C. or higher under pressure; or (Production process-2) A process for the production of acicularly particulate apatite which comprises mixing a raw material comprising (D) a mixture of either or both of a calcium phosphate compound and other phosphorus compounds and optionally a calcium compound (except calcium phosphate), (E) a metal compound comprising a metal other than calcium and (F) a fluorine compound with (C) water or a solvent comprising at least one selected from the group consisting of hydrophilic organic solvents to prepare a raw material solution, and then subjecting said raw material solution to hydrothermal synthesis.

The production processes-1, 2 will be further described hereinafter.

Production Process-1

Compound (A) described in production process-1 is not specifically limited so far as it is a calcium compound wherein the molar ratio (P/Ca) of phosphorus to calcium is not greater than 0.1 but is preferably a difficultly soluble calcium compound such as calcium carbonate, calcium hydroxide and calcium fluoride, a water-soluble calcium compound such as calcium chloride, calcium nitrate, calcium formate and calcium acetate, a calcium complex compound such as calcium ethylenediaminetetraacetate complex, calcium cyclohexanediaminetetraacetate complex, glycol ether diamine-calcium tetraacetate complex and calcium diethylenetriaminepentaacetate, a salt of carboxylic acid such as fumaric acid, tartaric acid, malic acid and succinic acid or mixture thereof. Preferred among these calcium compounds are water-soluble calcium compounds such as calcium chloride, calcium nitrate, calcium formate and calcium acetate from the standpoint of ability to obtain finer acicular apatite having a high aspect ratio. These calcium compounds may be used singly or in combination of two or more thereof.

Besides the aforementioned calcium compounds wherein the molar ratio (P/Ca) of calcium to phosphorus, metal compounds containing metal elements other than calcium may be added.

The aforementioned metal elements are not specifically limited so far as they are metal elements other than calcium. Specific examples of these metal elements include metal elements other than calcium such as elements of the groups I, II (except calcium), III, IV, V, VI, VII, VIII, XI, XII and XIII, tin and lead.

The aforementioned metal compounds containing these metals are not specifically limited so far as they are compounds of metals except calcium but are preferably inorganic metal compounds such as metal hydroxide (e.g., magnesium hydroxide, strontium hydroxide, barium hydroxide, lithium hydroxide, sodium hydroxide, potassium hydroxide, aluminum hydroxide, iron hydroxide, manganese hydroxide), metal chloride (e.g., magnesium chloride, strontium chloride, barium chloride, lithium chloride, sodium chloride, potassium chloride, aluminum chloride, iron chloride, manganese chloride), metal fluoride (e.g., magnesium fluoride, barium fluoride, strontium fluoride, lithium fluoride, sodium fluoride, potassium fluoride, aluminum fluoride), metal bromide (e.g., potassium bromide), metal iodide (e.g., potassium iodide, copper iodide), metal oxide (e.g., magnesium oxide, aluminum oxide), metal carbonate (e.g., magnesium carbonate, strontium carbonate, barium carbonate, lithium carbonate, sodium carbonate, potassium carbonate, aluminum carbonate), metal sulfate (e.g., potassium sulfate), metal nitrate (e.g., potassium nitrate) and metal silicate (e.g., sodium hexafluorosilicate), compound of metal element and monocarboxylic acid (e.g., copper acetate, aluminum stearate), compound of metal element and dicarboxylic acid (e.g., potassium adipate), compound of metal element and tricarboxylic acid (e.g., potassium citrate) or mixture thereof. Preferred among these metal compounds is magnesium, strontium, barium, lead, nickel, aluminum, copper, iron or mixture of two or more thereof.

In the case where the aforementioned calcium compound is mixed with the metal compound made of a metal other than calcium, i.e., the molar ratio Ca/(Ca+X) of calcium plus metal (X) other than calcium and calcium (Ca) is preferably from 0.70 to 1.00, more preferably from 0.75 to 0.98, even more preferably from 0.80 to 0.95. When the molar ratio Ca/(Ca+X) deviates from the above-mentioned range, a tendency is given that a fine acicular apatite can be hardly obtained.

The phosphoric acid or phosphorous acid ester compound (B) described in production process-1 is not specifically limited, but the phosphoric acid ester compound is preferably represented by the following general formula (II):

$$(RO)_nPO(OH)_{3-n} \quad (II)$$

In the general formula (II), n represents 1, 2 or 3, and R is preferably an alkyl group, phenyl group or substituted alkyl group obtained by substituting part of these groups, for example, by a hydrocarbon group. (RO) groups in the aforementioned general formula (II) may be the same or different. Examples of R described above include aliphatic groups such as methyl group, ethyl group, n-propyl group, i-propyl group, n-butyl group, i-butyl group, t-butyl group, n-pentyl group, n-hexyl group, n-octyl group, 2-ethylhexyl group, decyl group, lauryl group, tridecyl group, stearyl group and oleyl group, aromatic groups such as phenyl group and biphenyl group, aromatic groups having substituents such as hydroxyl group, methyl group, ethyl group, propyl group, t-butyl group, nonyl group, methoxy group and ethoxy group, etc.

Specific preferred examples of these groups include trimethyl phosphate, triethyl phosphate, tripropyl phosphate, tributyl phosphate, trioctyl phosphate, tributoxyethyl phosphate, tris(2-ethylhexyl)phosphate, triphenyl phosphate, diphenylcresyl phosphate, tricresyl phosphate, biphenyl phosphate, tris(2,4-di-t-butylphenyl)phosphate, tris(1,5-di-t-butylphenyl)phosphate, tris(dimethylphenyl)phosphate, tris(isopropylphenyl)phosphate, octyldiphenyl phosphate, and mixture thereof. Mostly preferred among these groups are trimethyl phosphate, triethyl phosphate, tripropyl phosphate, tributyl phosphate, and mixture thereof.

Further, the phosphorous acid ester compound is preferably represented by the following general formula (III):

$$(RO)_nP(OH)_{3-n} \quad (III)$$

In the general formula (III), n and R have the same meaning as in the aforementioned general formula (II). (RO) groups in the aforementioned general formula (III) may be the same or different.

Specific preferred examples of the phosphorous acid ester compound include ethyl phosphite, diethyl phosphite, dipropyl phosphite, dibutyl phosphite, diphenyl phosphite, trimethyl phosphite, triethyl phosphite, tripropyl phosphite, tributyl phosphite, trioctyl phosphite, tributoxyethyl phosphite, tris(2-ethylhexyl)phosphite, triphenyl phosphite, diphenylcresyl phosphite, tricresyl phosphite, biphenyl phosphite, tris(2,4-di-butylphenyl)phosphite, tris(1,5-di-t-butylphenyl)phosphite, tris(dimethylphenyl)phosphite, tris(isopropylphenyl)phosphite, octyldiphenyl phosphite, and mixture thereof.

In the present invention, the aforementioned phosphoric acid esters or phosphorous acid esters may be used singly or in combination of two or more thereof, e.g., triethyl phosphate and triphenyl phosphite in admixture.

The mixing proportion of (A) calcium compound having a phosphorus to calcium molar ratio (P/Ca) of not greater than 0.1 and (B) phosphoric acid or phosphorous acid ester compound in production process-1 is not specifically limited but is preferably from 1.0 to 2.0, more preferably from 1.20 to 1.90, most preferably from 1.33 to 1.70 as calculated in terms of the molar ratio (Ca/P) of calcium to phosphorus from the standpoint of ability to obtain desired apatite efficiently. When Ca/P deviates from the above-mentioned range, a tendency is given that a fine acicular apatite can be hardly obtained.

As for component (C) in production process-1, which is water or a solvent selected from the group consisting of hydrophilic organic solvents, the hydrophilic organic solvent is not specifically limited so far as it is a solvent compatible with water, but preferably includes alcohol-based solvents such as methanol, ethanol and ethylene glycol, amide-based solvents such as N,N-dimethylformamide and acetylacetamide, acetone, ether, dimethyl sulfoxide, and mixtures thereof. Furthermore, water and the aforementioned hydrophilic organic solvents may be used in admixture. The mixing proportion of solvents, if used in admixture, is not specifically limited but is preferably such that they do not undergo phase separation.

In the aforementioned production process-1, an organic compound having at least one carboxyl group in its molecular structure may be added for the purpose of obtaining a finely divided acicular apatite having a higher aspect ratio. Examples of the organic compound include carboxylic acids, ester compounds thereof, carboxylic acids having an amino group, salts or ester compounds thereof, lactams, acid anhydrides, halogenated acyls, etc.

The aforementioned carboxylic acids are not specifically limited but may be monocarboxylic acids, dicarboxylic acids, polyvalent carboxylic acids or the like. Examples of the monocarboxylic acids include aliphatic monocarboxylic acids such as formic acid, acetic acid, propionic acid, lactic acid, butyric acid, valeric acid, caproic acid, capric acid, undecylic acid, lauric acid, tridecylic acid, myristic acid, pentadecylic acid, palmitic acid, heptadeylic acid, stearic acid, nonadecanoic acid, arachic acid, behenic acid, lignoceric acid, cerotic acid, heptacosanic acid, montanic acid, melissic acid, lacceric acid and isobutylic acid, alicyclic monocarboxylic acids such as cyclohexanecarboxylic acid, aromatic monocarboxylic acids such as benzoic acid, toluic acid, α-naphthalenecarboxylic acid, β-naphthalenecarboxylic acid, methylnaphthalenecarboxylic acid and phenylacetic acid, etc.

Examples of the dicarboxylic acids include oxalic acid, malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebasic acid, suberic acid, dodecandioic acid, eicodionic acid, terephthalic acid, isophthalic acid, naphthalenedicarboxylic acid, 2-chloroterephthalic acid, 2-methylterephthalic acid, 5-methylisophthalic acid, 5-sodiumsulfoisophthalic acid, hexahydroterephthalic acid, hexahydroterephthalic acid, diglycolic acid, cyclohexanedicarboxylic acid, etc.

Examples of the polyvalent carboxylic acids include ethylenedimainetetraacetic acid, cyclohexanediaminetetraacetic acid, glycoletherdiaminetetraacetic acid, diethylenetriamine pentaacetic acid, etc.

Examples of the carboxylic acid ester compounds include methyl ester, ethyl ester, etc. of the aforementioned carboxylic acids.

The carboxylic acids having an amino group are not specifically limited but may be 6-amino caproic acid, 11-amino undecanoic acid, 12-amino dodecanoic acid or paraaminomethylbenzoic acid. Examples of the salts of carboxylic acid having amino group include hydrochloride, sulfate, phosphate, etc. of the aforementioned carboxylic acid having amino group.

Examples of the ester compounds of a carboxylic acid having an amino group include methyl ester compound, ethyl ester compound, etc. of the aforementioned carboxylic acids having amino group.

The lactams are not specifically limited but may be butyl lactam, pivalolactam, caprolactam, capryllactam, enantholactam, undecanolactam, dodecanolactam, etc.

The acid anhydrides are not specifically limited but may be acetic anhydride, benzoic anhydride, phthalic anhydride or the like.

The halogenated acyls are not specifically limited but may be acetyl chloride, propyl chloride, terephthalic acid chloride, isophthalic acid chloride or the like.

These organic compounds having at least one carboxylic acid in its molecular structure may be used singly or in combination of two or more thereof. Among these organic compounds, carboxylic acids and acid anhydrides are preferably used, most preferably monocarboxylic acids and dicarboxylic acids, for the purpose of obtaining finely divided acicular apatite having a high aspect ratio. Further, the weight ratio of the aforementioned organic compounds to (A) calcium compound is preferably from 0.01 to 20, more preferably from 0.1 to 10, most preferably from 0.3 to 5.

The concentration of the mixed raw material in the raw material solution, i.e., ratio of the total weight of (A) and (B) to the total weight of (C) is not specifically limited, but a mixed raw material concentration that allows the raw material solution to take a uniform solution or suspension may be selected and used arbitrarily. Preferably, the total weight of (A) and (B) based on 100 parts by weight of the total weight of (C) is from 1 to 200 parts by weight, more preferably from 5 to 100 parts by weight.

The order and method of mixing (A), (B) and (C) constituting the aforementioned raw material solution are not specifically limited. Further, these components may be mixed by stirring by an agitator, ultrasonic wave, homogenizer or the like.

The temperature at which the aforementioned (A) and (B) are mixed with the solvent (C) is preferably lower than 100° C., more preferably lower than 70° C., even more preferably lower than 40° C. from the standpoint of handleability.

The hydrothermal synthesis in production process-1 is effected at a temperature of not lower than 120° C. under pressure.

The hydrothermal synthesis temperature is not lower than 120° C. but is preferably from 150° C. to 400° C., more preferably from 200° C. to 375° C. from the standpoint of ability to obtain finely divided acicular apatite efficiently.

The hydrothermal synthesis pressure is not particularly limited so far as some pressure is applied, but is preferably 0.5 MPa or greater, more preferably 1.0 MPa or greater, still more preferably 1.5 MPa or greater, and most preferably 2.0 MPa or greater, from the standpoint of ability to obtain finely divided acicular apatite efficiently.

Further, the hydrothermal synthesis method is not specifically limited but may be a method which comprises enclosing a raw material solution in a reaction vessel such as autoclave, replacing the air in the reaction vessel by an inert gas such as nitrogen, and then subjecting the material to hydrothermal synthesis in sealed state under the aforementioned temperature conditions at about saturated water vapor pressure, a method which comprises withdrawing water or the hydrophilic solvent from the reaction vessel during hydrothermal synthesis so that hydrothermal synthesis is effected at a pressure of lower than the saturated water vapor pressure, mixture thereof or the like.

The apparatus for effecting hydrothermal synthesis to be used in the present invention may be a pressure-resistant reaction vessel such as autoclave and is not specifically limited. In particular, an autoclave type reaction vessel equipped with an agitator is mostly preferred from the standpoint of ability to obtain acicularly particulate apatite.

The hydrothermal synthesis time may be arbitrarily predetermined to complete reaction but is preferably 2 hours or longer, more preferably 4 hours or longer.

In the present invention, the acicular apatite-containing slurry obtained in the aforementioned production process-1 may be separated by centrifugal separation or filtration or may be used as it is.

Production Process-2

The calcium compound in component (D) described in production process-2 is not specifically limited so far as it is a calcium compound free of phosphorus or fluorine but may be a water-soluble calcium compound or difficultly-soluble calcium compound.

Examples of the water-soluble calcium compound include calcium chloride, calcium nitrate, calcium formate, calcium acetate, calcium complex compound such as calcium ethylenediaminetetraacetate complex, calcium cyclohexanediamine tetraacetate complex, calcium glycol ether diaminetetraacetate complex and calcium diethylenetriaminepentaacetate, organic calcium compound such as calcium fumarate, calcium tartrate, calcium malate and calcium succinate, and mixture thereof.

Examples of the difficultly soluble calcium compound include calcium carbonate, calcium hydroxide, and mixture thereof.

Preferred among these difficultly soluble calcium compounds are calcium carbonate, calcium hydroxide, calcium chloride and calcium nitrate from the standpoint of cost. More desirable among these difficultly soluble calcium compounds are calcium carbonate and calcium hydroxide from the standpoint of ability to obtain finer acicular apatite.

These difficultly soluble calcium compounds may be used singly or in combination of two or more thereof.

The phosphorus compound in component (D) described in production process-2 is a phosphorus compound excluding the calcium phosphate compound as defined below and compounds of phosphoric acid with a metal other than calcium, and is not specifically limited. For examples, the phosphorus compound may be phosphoric acid, phosphorous acid, hypophosphorus acid, salt thereof with ammonium or the phosphoric acid ester compound or hypophosphorous acid ester compound described in the aforementioned production process-1.

Preferred among these phosphorus compounds are phosphoric acid, salts thereof with ammonium, and phosphoric acid esters from the standpoint of cost. More desirable among these phosphorus compounds are phosphoric acid, triethyl phosphate, and trimethyl phosphate, most preferably phosphoric acid from the standpoint of ability to obtain finer acicular apatite. These phosphorus compounds may be used singly or in combination of two or more thereof.

Examples of the calcium phosphate compound in component (D) described in production process-2 include calcium monohydrogenphosphate ($CaHPO_4.mH_2O$, in which $0 \leq m \leq 2$), calcium dihydrogendiphosphate ($CaH_2P_2O_7$), calcium dihydrogenphosphate monohydrate ($Ca(H_2PO_4)_2.H_2O$), calcium diphosphate ($\alpha$- and $\beta$-$Ca_2P_2O_7$), tricalcium phosphate ($\alpha$- and $\beta$-$Ca_3(PO_4)_2$), tetracalcium phosphate ($Ca_4(PO_4)_2O$), octacalcium phosphate pentahydrate ($Ca_8H_2(PO_4)_6 \cdot 5H_2O$), calcium phosphite monohydrate ($CaHPO_3.H_2O$), calcium hypophosphite ($Ca(H_2PO_2)_2$), mixture thereof, etc.

Preferred among these calcium phosphate compounds are calcium monohydrogenphosphate ($CaHPO_4.mH_2O$, in which $0 \leq m \leq 2$), tricalcium phosphate ($\alpha$- and $\beta$-$Ca_3(PO_4)_2$), and octacalcium phosphate pentahydrate ($Ca_8H_2(PO_4)_6.5H_2O$), most preferably calcium monohydrogenphosphate ($CaHPO_4.mH_2O$, in which $0 \leq m \leq 2$) and octacalcium phosphate pentahydrate ($Ca_8H_2(PO_4)_6.5H_2O$), from the standpoint of ability to obtain finely divided acicular apatite. These calcium phosphate compounds may be used singly or in combination of two or more thereof.

In production process-2, as the raw material (D) there may be arbitrarily and selectively used a combination of the aforementioned calcium compound and phosphorus compound, a combination of the aforementioned calcium compound and calcium phosphate compound, a combination of the aforementioned phosphorus compound and calcium phosphate compound, a combination of the aforementioned calcium compound, phosphorus compound and calcium phosphate compound, calcium phosphate alone or the like. Preferred among these materials is a combination of at least one selected from the group consisting of calcium carbonate and calcium hydroxide and at least one selected from the group consisting of phosphoric acid, phosphoric acid esters, calcium monohydrogenphosphate, tricalcium phosphate and octacalcium phosphate pentahydrate, more preferably a combination of calcium carbonate and at least one selected from the group consisting of calcium monohydrogenphosphate, tricalcium phosphate and octacalcium phosphate pentahydrate, from the standpoint of ability to obtain a large amount of acicular apatite at a low cost.

The metal compound of a metal other than calcium (E) described in production process-2 is not specifically limited except fluorine compound but is preferably a compound containing elements such as Sr, Ba, Pb, Zn, Cd, Mg, Fe, Mn, Ni, Cu, Hg, Al, Y, Ce, Nd, La, Dy and Eu.

Examples of the metal compound include metal hydroxides (e.g., magnesium hydroxide, strontium hydroxide, barium hydroxide, aluminum hydroxide), metal chlorides (e.g., magnesium chloride, strontium chloride, barium chloride, aluminum chloride), metal bromides (e.g., aluminum bromide, cobalt bromide, strontium bromide), metal iodides (e.g., lead iodide, barium iodide), metal oxides (e.g., magnesium oxide (light and heavy), aluminum oxide, cadmium oxide, thallium oxide), metal alkoxides (e.g., aluminum ethoxide, aluminum isopropoxide, magnesium ethoxide), metal carbonates (e.g., magnesium carbonate, strontium carbonate, barium carbonate, aluminum carbonate), metal sulfates (e.g., nickel sulfate, magnesium sulfate, manganese sulfate), metal perchlorates (e.g., magnesium perchlorate, barium perchlorate) and metal silicates (e.g., aluminum silicate, magnesium silicate), compounds of metal element with monocarboxylic acid (e.g., copper acetate, lead acetate, manganese benzoate, aluminum stearate, magnesium stearate, barium stearate), compounds of metal element with dicarboxylic acid (e.g., barium oxalate, magnesium oxalate, europium oxalate, lanthanum oxalate), compounds of metal element with tricarboxylic acid (e.g., magnesium citrate, copper citrate 2.5 hydrate), compounds of metal element with phosphoric acid (barium secondary hydrogenphosphate, copper phosphate, iron phosphate, manganese phosphate, magnesium secondary phosphate, magnesium tertiary phosphate, aluminum orthophosphate, copper diphosphate tetrahydrate), etc.

These raw materials may be used singly or in combination of two or more thereof. In the case where two or more of these raw materials are used in combination, compounds containing the same kind of metal element may be used in combination as in mixture of magnesium hydroxide and magnesium carbonate or compounds containing different kinds of metals may be used in combination as in mixture of magnesium carbonate and aluminum hydroxide.

In the present invention, among these compounds, metal hydroxides, metal chlorides, metal carbonates, compounds of metal with phosphoric acid or mixtures thereof are preferably used judging from cost or crystal form. More desirable among these compounds are hydroxide, chloride and carbonate of zinc, magnesium, iron, nickel, copper, aluminum and iron, compounds of these metals with phosphoric acid and mixtures thereof, even more preferably hydroxide, chloride and carbonate of magnesium, iron and copper, compounds of these metals with phosphoric acid and mixtures thereof, most preferably compounds of magnesium, iron and copper with phosphoric acid.

The fluorine compound (F) described in production process-2 is not specifically limited so far as it is a compound containing fluorine but is preferably a metal fluoride such as hydrogen fluoride, calcium fluoride, aluminum fluoride, magnesium fluoride, ammonium fluoride and barium fluoride, fluorosilicate such as hexafluorosilicate, sodium hexafluorosilicate and magnesium hexafluorosilicate hexahydrate or mixture thereof. Preferred among these fluorine compounds are metal fluorides such as calcium fluoride and magnesium fluoride from the standpoint of ability to obtain acicular particles. These fluorine compounds may be used singly or in combination of two or more thereof.

In the aforementioned raw materials, i.e., (D) calcium compound, phosphorus compound, and/or calcium phosphate compound, (E) compound of metal other than calcium, and (F) fluorine compound, the molar ratio of calcium (Ca) plus metal (X) other than calcium to phosphorus, i.e., (Ca+X)/P is not specifically limited but is preferably from 1.00 to 2.00, more preferably from 1.10 to 1.8, most preferably from 1.20 to 1.67 from the standpoint of ability to obtain acicular apatite efficiently. When (Ca+X)/P deviates from the above-mentioned range, a tendency is given that the yield of finely divided acicular apatite is lowered.

In the aforementioned raw materials, i.e., (D) calcium compound, phosphorus compound, and/or calcium phosphate compound, (E) compound of metal other than calcium, and (F) fluorine compound, the molar ratio Ca/(Ca+X) of calcium (Ca) plus metal (X) other than calcium and calcium (Ca) is not specifically limited but is preferably from 0.70 to 1.00, more preferably from 0.75 to 0.98, most preferably from 0.80 to 0.95 from the standpoint of ability to obtain acicular apatite efficiently.

In the aforementioned raw materials, i.e., (D) calcium compound, phosphorus compound, and/or calcium phosphate compound, (E) compound of metal other than calcium, and (F) fluorine compound, the molar ratio (Ca+X)/F of calcium (Ca) plus metal (X) other than calcium and fluorine is not specifically limited but is preferably from 5.0 to 1,000, more preferably from 5.0 to 100, most preferably from 5.0 to 100 from the standpoint of ability to obtain acicular apatite efficiently.

As the water or hydrophilic solvent described in production process-2 there may be used water or a solvent comprising at least one selected from the group consisting of hydrophilic organic solvents as in (C) described in production process-1.

As the hydrothermal synthesis process in production process-2 there may be used the hydrothermal synthesis process described in Process process-1.

The concentration of the mixed raw material in the raw material solution, i.e., ratio of the total weight of (D), (E) and (F) to the weight of (C) is not specifically limited but may be predetermined arbitrary such that the raw material solution is a uniform solution or suspension. Preferably, the total weight of (D), (E) and (F) based on 100 parts by weight of the weight of (C) is from 0.01 to 200 parts by weight, more preferably from 0.5 to 100 parts by weight, even more preferably from 1 to 50 parts by weight. When the concentration of the raw material in the raw material solution deviates from the above-mentioned range, a tendency is given that acicular apatite can be hardly obtained.

The hydrothermal synthesis temperature in this case is not specifically limited but is preferably from 150° C. to 400° C., more preferably from 200° C. to 375° C. from the standpoint of ability to obtain finely divided acicular apatite efficiently.

The hydrothermal synthesis pressure during this procedure is not specifically limited so far as the hydrothermal synthesis is effected under pressure but is preferably not lower than 0.5 MPa, more preferably not lower than 1.0 MPa, even more preferably not lower than 1.5 MPa, most preferably not lower than 2.0 MPa from the standpoint of ability to obtain finely divided acicular apatite efficiently.

In the present invention, the acicular apatite-containing slurry synthesized in the aforementioned production process-2 may be separated by centrifugal separation or filtration or may be used as it is.

The process for the production of tabular apatite having an average thickness of not greater than 100 nm and an average aspect ratio of not smaller than 5 among the apatites to be used in the present invention is not specifically limited but is preferably a process which comprises subjecting an octacalcium phosphate compound, preferably an octacalcium phosphate compound having an average thickness of not greater than 100 nm and an average aspect ratio of not smaller than 5 to heat treatment at 40° C. to 400° C. for the purpose of obtaining finely divided acicular apatite having a high aspect ratio in a high yield.

The octacalcium phosphate compound is represented by the following general formula:

$Ca_8H_2(PO_4)_6 \cdot nH_2O (0 \leq n \leq 5)$

The aforementioned calcium phosphate is known to normally have a layer form and a thickness of not greater than 100 nm.

The octacalcium phosphate to be used in the production of tabular apatite in the present invention is not specifically limited so far as it is represented by the aforementioned general formula but preferably has an average thickness of not greater than 100 nm and an average aspect ratio of not smaller than 5. Further, calcium or hydrogen may be replaced by metal elements other than calcium such as elements of the groups I, II (except calcium), III, IV, V, VI, VII, VIII, XI, XII and XIII, tin and lead. Preferred among these metal elements other than calcium are magnesium, strontium and barium, which are elements of the group II, particularly copper, iron and mixture of two or more thereof. The molar ratio Ca/(Ca+X) of calcium (Ca) and calcium (Ca) plus metal (X) other than calcium is preferably from 0.70 to 1.00, more preferably from 0.80 to 1.00, still more preferably from 0.95 to 1.00 from the standpoint of crystallinity.

The quantitative determination of metal elements such as calcium and phosphorus in the octacalcium phosphate to be used in the production of tabular apatite in the present invention can be carried out the use of a high frequency inductively coupled plasma (ICP) emission spectroscope analysis. In some detail, 0.5 g of the particulate octacalcium phosphate compound is measured out in a platinum plate, and then carbonized in a 500° C. electric furnace. After cooling, to the material thus carbonized are then added 5 ml of hydrochloric acid and 5 ml of purified water. The mixture is then boiled over a heater to make solution. The solution is then again cooled. To the solution is then added purified water to make 500 ml. The solution is then subjected to quantitative determination by a high frequency inductively coupled plasma (ICP) emission spectroscope analysis at a wavelength of 317.933 nm. Metals other than calcium can be quantitatively determined in the same manner as mentioned above using wavelength characteristic to the target metals.

On the other hand, 0.5 g of the particulate octacalcium phosphate compound was measured out. To the material was then added 20 ml of concentrated sulfuric acid. The specimen was then subjected to wet decomposition over a heater. After cooling, to the specimen was then added 5 ml of hydrogen peroxide. The specimen was then heated and concentrated over a heater until the total amount thereof reached 2 to 3 ml. The specimen was then again cooled. To the specimen was then added purified water to make 500 ml. The specimen was then subjected to quantitative determination by a high frequency inductively coupled plasma (ICP) emission spectroscope analysis at a wavelength of 213.618 (nm) to determine phosphorus concentration.

The qualitative identification of the octacalcium phosphate compound to be used in the production of tabular apatite in the present invention can be carried out by wide-angle X-ray diffractometry, infrared absorption spectrum or the like. Referring further to identification method by wide-angle X-ray diffractometry, wide-angle X-ray diffraction is measured using copper Kα (wavelength λ=0.1542 nm) as a X-ray source. (010) plane peak is present in the vicinity of diffraction angle of 4.7 degrees. (020) plane is present in the vicinity of diffraction angle of 9.4 degrees. (110) plane is present in the vicinity of diffraction angle of 9.8 degrees. Further, (002) plane is present in the vicinity of diffraction angle of 26 degrees, and (260) plane is present in the vicinity of diffraction angle of 32 degrees. For the details of these diffraction lines, reference can be made to JCPDS card No. 26-1056 of LCPDS-International Centre for Diffraction Date.

The method for synthesis of the octacalcium phosphate compound to be used in the production of tabular apatite in the present invention is not specifically limited but may be a known synthesis method such as precipitation method involving the mixture of calcium solution and phosphoric acid solution, method involving the hydrolysis of calcium hydrogenphosphate and method involving the hydrolysis of tricalcium phosphate as described in Kadoma, "Review of Octacalcium Phosphate Compounds" (Gypsum and Lime No. 166, 113 (1980). In particular, as a method for obtaining an octacalcium phosphate compound in a large amount and a high yield there may be used a synthesis method disclosed in JP-A-6-122510 which comprises reacting calcium hydrogenphosphate and calcium carbonate in an aqueous suspension at 35° C. to 68° C. with the molar ratio (Ca/P) of calcium to phosphorus being adjusted to a range of from 1.30 to 1.60.

The method for heat treatment of the octacalcium phosphate compound to be used in the production of tabular apatite in the present invention is not specifically limited and can be roughly classified as:

(Production process-3) A process which comprises subjecting an octacalcium phosphate compound to heat treatment in a slurry form; and (Production process-4) A process which comprises subjecting an octacalcium phosphate compound to heat treatment in a powdery form.

Production processes-3, 4 will be described hereinafter.

Production Process-3

The concentration of the octacalcium phosphate compound slurry in the solvent during heat treatment is not specifically limited, but the amount of the octacalcium phosphate compound based on 100 parts by weight of the solvent is preferably from 0.01 to 300 parts by weight, more preferably from 0.1 to 100 parts by weight, even more preferably from 1 to 50 parts by weight from the standpoint of ability to obtain tabular apatite in a high yield.

As the aforementioned solvent there is preferably used water or a solvent comprising at least one selected from the group consisting of hydrophilic organic solvents judging from the form of tabular apatite thus produced. As the hydrophilic organic solvents there may be used the same hydrophilic organic solvents as (C) described in the aforementioned production process-1. Further, water and the aforementioned hydrophilic organic solvents may be used in admixture. The mixing proportion of the two solvents, if used in admixture, is not specifically limited but is preferably such that the two solvents undergo no phase separation.

The temperature to be used in production process-3 at which the slurry suspension of octacalcium phosphate compound is subjected to heat treatment is preferably from 40° C. to 600° C., more preferably from 50° C. to 400° C., most preferably from 60° C. to 350° C. When this temperature falls within the above-defined range, it does not take much time to produce tabular apatite because the temperature is not too low. Further, the resulting tabular apatite undergoes no decomposition because the temperature is not too high, giving no apprehension that the yield is lowered.

During this procedure, heating may be carried out by the use of hydrothermal synthesis. The pressure at which the synthesis is conducted is not specifically limited so far as the synthesis is effected under pressure but is preferably not lower than 0.5 MPa, more preferably not lower than 1.0 MPa, even more preferably not lower than 1.5 MPa, most preferably not lower than 2.0 MPa from the standpoint of ability to obtain finely divided tabular apatite efficiently.

The hydrothermal synthesis method is not specifically limited and may be a method described in production process-1.

Further, in production process-3, heat treatment may be effected in a solution having a thermoplastic resin raw material component such as polyamide, vinyl chloride polymer, polyvinyl polymer and polymethyl methacrylate polymer incorporated therein. In this case, tabular apatite is fairly dispersed in the aforementioned resin raw material component, and the various raw material components are adsorbed to the interface. Therefore, when used as a filler for resin, tabular apatite thus obtained shows a good affinity for the resin, exerting a high reinforcing effect. In particular, the polyamide raw material component can be adsorbed to the interface of tabular apatite. When kneaded with a resin, the filler exhibits a good wettability by the resin, exerting a particularly high reinforcing effect.

The weight ratio of the octacalcium phosphate to the aforementioned thermoplastic resin raw material component is not specifically limited, but the amount of the raw material monomer component based on 100 parts by weight of the octacalcium phosphate is preferably from 0.01 to 1,000 parts by weight, more preferably from 0.1 to 100 parts by weight, most preferably from 1 to 10 parts by weight. When the weight ratio falls within the above defined range, a stable suspension slurry of octacalcium phosphate can be obtained, giving no apprehension that the yield of tabular apatite is lowered.

In the present invention, the tabular apatite-containing slurry obtained in the aforementioned production process-3 may be separated by centrifugal separation or filtration or may be used as it is.

Production Process-4

The heating temperature at which the octacalcium phosphate compound is subjected to heat treatment in an atmosphere of incombustible gas such as air and nitrogen is preferably from 40° C. to 600° C., more preferably from 50° C. to 400° C., most preferably from 60° C. to 350° C. from the standpoint of time required to produce tabular apatite, yield, etc.

The heat treatment time is not specifically limited but is preferably from 30 seconds to 4 hours, more preferably from 1 minute to 1 hour to obtain tabular apatite efficiently in a high yield.

The apparatus for heat treatment is not specifically limited and may be a crucible, autoclave vessel or the like.

In the present invention, the tabular apatite powder synthesized in the aforementioned production process-4 may be used as it is in the form of powder or may be added to a solvent or the like so that it is used in the form of slurry.

In the present invention, the apatite slurry having an average diameter or average thickness (d) of not greater than 100 nm and an average aspect ratio (L/d) of not smaller than 5 as defined by the ratio of the average length (L) to said average diameter or average thickness (d) produced by the aforementioned production processes-1 to 4 may have a dispersant or coupling agent incorporated therein before use for the purpose of stabilizing itself over an extended period of time and enhancing the dispersibility thereof.

The aforementioned dispersant is not specifically limited and may be a known dispersant. For example, anionic surface active agents, cationic surface active agents, ampho-teric surface active agents, nonionic surface active agents, etc. as described in Fumio Kitahara, "Solution and Applied Technique of Dispersion and Agglomeration, 1992", Technosystem, pp. 232–237 may be used.

Among these dispersants, anionic surface active agents and nonionic surface active agents are preferably used. In particular, from the standpoint of price and physical properties, sucrose esters such as sodium citrate, sodium polyacrylate, ammonium polyacrylate and sucrose stearate ester are more desirable.

The aforementioned coupling agent is not specifically limited and may be a known coupling agent. Preferred examples of such a coupling agent include silane-based coupling agent, and titanium-based coupling agent.

Examples of the silane-based coupling agent include triethoxysilane, vinyltris(β-methoxyethoxy)silane, γ-methacryloxy propyltrimethoxysilane, γ-glycidoxypropyltrimethoxysilane, β-(1,1-epoxycyclohexyl)ethyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyl trimethoxysilane, γ-chloropropyltrimethoxysilane, γ-aminopropyl trimethoxysilane, γ-aminopropyl-tris(2-methoxy-ethoxy)silane, N-methyl-γ-aminopropyltrimethoxysilane, N-vinylbenzyl-γ-aminopropyl triethoxysilane, triaminopropyltrimethoxysilane, 3-ureidopropyl trimethoxysilane, 3-4,5-dihydroimidazolepropyltriethoxysilane, hexamethyldisiloxane, N,O-(bistrimethylsilyl)amide, N,N-bis(trimethylsilyl)urea, and mixture thereof.

Among these silane-based coupling agents, aminosilanes and epoxysilanes such as γ-aminopropyl trimethoxysilane, N-β-(aminoethyl)-γ-aminopropyl trimethoxysilane, γ-glycidoxypropyltrimethoxysilane and β-(1,1-epoxycyclohexyl)ethyltrimethoxysilane are preferably used because they are economically advantageous and can be easily handled.

Examples of the titanium-based coupling agent include isopropyltriisostearoyl titanate, isopropyltridecylbenzene sulfonyl titanate, isopropyltris(dioctylpyrophosphate)titanate, tetraisopropylbis(dioctyl phosphite)titanate, tetraoctylbis(ditridecyl phosphite)titanate, tetra(1,1-diallyloxymethyl-1-butyl)bis(ditridecyl)phosphite titanate, bis(dioctyl pyrophosphate)oxyacetae titanate, bis(dioctyl pyrophosphate)ethylene titanate, isopropyl trioctanoyl titanate, isopropyldimethacrylyl isostearoyl titanate, isopropyl isostearoyl diacryl titanate, isopropyltri(dioctyl phosphate) titanate, isopropyltricumylphenyl titanate, isopropyltri(N-amideethyl, aminoethyl)titanate, dicumylphenyloxy acetate titanate, diisostearoylethylene titanate, and mixture thereof.

These dispersants are preferably added in an amount of from 0.001 to 100 parts by weight, more preferably from 0.01 to 20 parts by weight, most preferably from 0.05 to 10 parts by weight based on 100 parts by weight of the apatite.

In the present invention, in the case where the apatite having an average diameter or average thickness (d) of not greater than 100 nm and an average aspect ratio (L/d) of not smaller than 5 as defined by the ratio of the average length (L) to said average diameter or average thickness (d) produced by the aforementioned production processes-1 to 4 is used in the form of powder, the powdery tabular apatite obtained by the aforementioned processes may be subjected to surface treatment with a surface treatment agent for the purpose of improving the dispersibility in the resin and the adhesion to the interface with the resin.

The surface treatment may be carried out by the use of a surface treatment agent such as silane-based coupling agent, titanium-based coupling agent and film-forming agent.

Examples of the film-forming agent include polymers such as urethane-based polymer, acrylic acid-based polymer, copolymer of maleic anhydride with an unsaturated monomer such as ethylene, styrene, α-methylstyrene, butadiene, isoprene, chloroprene, 2,3-dichlorobutadiene, 1,3-pentadiene and cyclooctadiene, epoxy-based polymer, polyester-based polymer, vinyl acetate-based polymer and polyether-based polymer. Among these film-forming agents, urethane-based polymer, acrylic acid-based polymer, butadiene-maleic anhyride copolymer, ethylene-maleic anhydride copolymer, styrene-maleic anhydride copolymer, and mixture thereof are particularly preferably used.

The surface treatment of apatite with such a coupling agent and film-forming agent can be carried out by a known method. In some detail, a sizing method involving the application of an organic solvent solution or suspension of the aforementioned coupling agent and film-forming agent to the surface of apatite as a so-called sizing agent, a dry mixing method involving the application of the organic solvent solution or suspension to the surface of apatite using a Henschel mixer, super mixer, ready-mixer, V-blender or the like, a spray method involving the spraying of the organic solvent solution or suspension onto the surface of apatite, an integral blending method, and a dry concentration method may be employed. Alternatively, a method involving these methods in combination, e.g., method which comprises applying a part of the coupling agent and film-forming agent to the surface of apatite by a sizing treatment, and then spraying the rest of the film-forming agent onto the surface of apatite may be employed. Among these methods, sizing treatment, drying mixing method, spraying method and combination thereof are preferably employed from the standpoint of economy.

The process for the production of the resin composition of the present invention is not specifically limited, but examples of the production process include the following:

(Production process-a) Process which comprises mixing a resin with apatite having an average diameter or average thickness (d) of not greater than 100 nm and an average aspect ratio (L/d) of not smaller than 5 as defined by the ratio of the average length (L) to said average diameter or average thickness (d) which has been previously produced to obtain the resin composition;

(Production process-b) Process which comprises mixing a resin with apatite having an average diameter or average thickness (d) of not greater than 100 nm and an average aspect ratio (L/d) of not smaller than 5 as defined by the ratio of the average length (L) to said average diameter or average thickness (d) which has been previously produced, and then subjecting the mixture to polymerization to obtain the resin composition;

(Production process-c) Process which comprises mixing a resin or raw resin material with octacalcium phosphate, and then subjecting the mixture to heat treatment or polymerization at 40C to 400° C. to effect the production of tabular apatite as defined in the present invention and the production of the resin composition at the same time; and (Production process-d) Process which comprises mixing a raw resin material with (D) a calcium compound, a phosphorus compound and/or a calcium phosphate compound, (E) a metal compound comprising a metal other than calcium and (F) a fluorine compound, and then subjecting the mixture to polymerization to effect the production of acicular apatite as defined in the present invention and the production of the resin composition at the same time.

Production processes-a to d will be described hereinafter.

Production Process-a

In production process-a, a resin is mixed with apatite having an average diameter or average thickness (d) of not greater than 100 nm and an average aspect ratio (L/d) of not smaller than 5 as defined by the ratio of the average length (L) to said average diameter or average thickness (d) which has been previously produced to obtain the desired resin composition. As the apatite there may be used a slurried or powdery apatite produced by the aforementioned production processes-1 to 4.

Examples of the mixing method include a method which comprises melt-kneading the resin with apatite to produce the resin composition, a method which comprises mixing the resin with apatite in a solution, etc. Alternatively, a method may be employed which comprises preparing a master batch comprising the apatite incorporated in the resin in a high concentration using the aforementioned method, and then mixing the master batch with the resin. Further, these methods may be employed in combination as necessary.

The mixing proportion of the resin and the apatite during this procedure is not specifically limited, but the proportion of the apatite based on 100 parts by weight of the resin is preferably from 0.01 to 1,000 parts by weight, more preferably from 0.05 to 500 parts by weight, even more preferably from 0.1 to 300 parts by weight.

Among the aforementioned production processes, the production process involving melt kneading may employ a commonly practiced kneading machine as a device for melt kneading. For example, a monoaxial or multi-screw extruder, roll, Banbury mixer or the like may be employed. Mostly preferred among these kneading machines is twin-screw extruder equipped with a pressure reducing device and a side feeder. The melt kneading may be carried out by kneading all the components at the same time. A method which comprises kneading a blend obtained by previously kneading the materials may be employed. Further, the various components may be fed successively in the middle portion of the extruder during kneading. When the apatite is added in the form of slurry, it is preferably fed in the middle portion of the extruder using a liquid supplying pump.

The melt kneading conditions are not specifically limited, but the pressure is preferably from 0 to 0.07 MPa. The kneading temperature is preferably from 1 to 100° C. higher than the melting point or softening point determined by differential scanning calorimetry (DSC) according to JISK7121. The shearing rate in the kneading machine is preferably not lower than 100 ($SEC^{-1}$), and the average residence time during kneading is preferably from 1 to 15 minutes. The amount of the solvent in the resin composition is preferably not greater than 1% by weight. When the melt kneading conditions fall within the above defined ranges, phenomena such as reduction of productivity and moldability and insufficiency of external appearance of the resulting molded product and improvement of physical properties can seldom occur.

Production Process-b

In production process-a, a raw resin material is mixed with apatite having an average diameter or average thickness (d) of not greater than 100 nm and an average aspect ratio (L/d) of not smaller than 5 as defined by the ratio of the average length (L) to said average diameter or average thickness (d) which has been previously produced. The mixture is then subjected to polymerization to obtain the desired resin composition. As the apatite there may be used a slurried or powdery apatite produced by the aforementioned production processes-1 to 4.

Examples of the method for mixing the raw resin material with apatite include a method which comprises adding the apatite directly to the raw resin material powder or solution thereof, and a method which comprises dispersing the apatite in a solvent to make a slurry, and then adding the slurry to the raw resin material. Alternatively, the apatite powder or slurry may be added in the course of polymerization of the raw resin material before continuance of polymerization. The mixing proportion of the raw resin material and the apatite during this procedure are not specifically limited, but the proportion of the apatite based on 100 parts by weight of the resin is preferably from 0.01 to 1,000 parts by weight, more preferably from 0.05 to 500 parts by weight, even more preferably from 0.1 to 300 parts by weight.

The method for polymerization of resin is not specifically limited and may be a known method. For example, in the case where a polyamide is used as a resin, a preferred method comprises mixing the raw polyamide material and the apatite, and then subjecting the polyamide to polymerization.

The mixing of the raw polyamide material with the apatite may be carried out by any of a method involving direct mixing of a solid raw polyamide material with the apatite, a method involving mixing of an aqueous solution of raw polyamide material with the apatite slurry, etc.

In the present invention, the method for polymerization of polyamide is not specifically limited and may be a known method. For example, a method which comprises heating a difficultly water-soluble component such as 11-aminoundecanic acid as a raw material to a temperature of from 200° C. to 290° C. to effect polycondensation, a lactam ring-opening polycondensation method which comprises heating an aqueous solution of ε-caprolactam as a raw material to a temperature of from 200° C. to 290° C. in a flow of inert gas optionally with an end blocking agent such as monocarboxylic acid or a reaction accelerator such as ε-aminocaproic acid added thereto to effect polycondensation, a heat fusion polycondensation method which comprises subjecting an aqueous solution of salt of diamine component with dicarboxylic acid component such as aqueous solution of hexamethylene adipamide to heat concentration at a temperature of from 200° C. to 290° C., and then subjecting the material to polycondensation while the resulting water vapor pressure being kept at a proper value between 10 and 20 atm, eventually reduced to normal pressure or reduced pressure, may be employed.

Further, a solid phase polymerization method which is effected at a temperature of not higher than the melting point of solid salt or polycondensate of diamine component and dicarboxylic acid component, a solution method which comprises subjecting a dicarboxylic acid halide and a diamine component to polycondensation in a solution, etc. may be employed. These methods may be employed in combination as necessary. The polymerization may be effected batchwise or continuously. The polymerization apparatus is not specifically limited and may be a known apparatus such as autoclave reactor, tumbler type reactor and extruder type reactor (e.g., kneader).

Production Process-c

In production process-c, a resin or raw resin material is mixed with octacalcium phosphate, and the mixture is then subjected to heat treatment or polymerization at 40° C. to 400° C. to effect the production of tabular apatite as defined in the present invention and the production of the resin composition at the same time. Thus, the interface of tabular apatite exhibits a good wettability by the resin, exerting a high effect of reinforcing the resin composition. The octacalcium phosphate corresponds to the general formula of octacalcium phosphate described in the present specification and is not specifically limited and may be a known octacalcium phosphate.

The octacalcium phosphate to be used herein may be used in the form of slurry or powder and a known dispersant and surface treatment agent may be used for the purpose of improving the affinity thereof for the resin or raw resin material.

In practice, a method which comprises melt-kneading slurried or powdery octacalcium phosphate with a resin to produce the resin composition, a method which comprises mixing slurried or powdery octacalcium phosphate with the resin in a solution or a method which comprises adding slurried or powdery octacalcium phosphate to the raw resin material, and then subjecting the mixture to polymerization may be employed. The kneading or polymerization temperature during this procedure is not specifically limited so far as it falls within the range of from 40° C. to 400° C.

Production Process-d

In production process-d, a resin or raw resin material is mixed with a raw material comprising (D) a mixture of either or both of a calcium phosphate compound and other phosphorus compounds and optionally a calcium compound (except calcium phosphate), (E) a metal compound comprising a metal other than calcium and (F) a fluorine compound, and the mixture is then subjected to heating or polymerization to effect the production (synthesis) of acicular apatite as defined in the present invention and the production of the resin composition at the same time. Thus, the interface of the acicular apatite exhibits a good wettability by the resin, exerting a particularly high effect of reinforcing the resin composition.

As the aforementioned (D) calcium compound, phosphorus compound and/or calcium phosphate compound, (E) metal compound other than calcium and (F) fluorine compound there are preferably used compound groups described in the aforementioned production process-2 of apatite. In production process-d, from the standpoint of ability to obtain a resin composition having a higher strength and higher rigidity, the molar ratio (Ca+X)/P of calcium (Ca) plus metal (X) other than calcium and phosphorus in the aforementioned raw material, i.e., (D) calcium compound, phosphorus compound, and/or calcium phosphate compound, (E) metal compound other than calcium, and (F) fluorine compound is preferably from 1.00 to 2.00, more preferably from 1.10 to 1.8, most preferably from 1.20 to 1.67. Similarly, the molar ratio Ca/(Ca+X) of calcium (Ca) plus metal (X) other than calcium and calcium (Ca) is preferably from 0.70 to 1.00, more preferably from 0.75 to 0.98, most preferably from 0.80 to 0.95. Similarly, the molar ratio (Ca+X)/F of calcium (Ca) plus metal (X) other than calcium and fluorine is preferably from 5.0 to 1,000, more preferably from 5.0 to 100, most preferably from 5.0 to 50.

Examples of the method for mixing the raw resin material with the aforementioned components (D), (E) and (F) include a method which comprises adding components (D), (E) and (F) directly to the raw resin material powder or solution thereof, and a method which comprises dispersing the aforementioned components (D), (E) and (F) in a solvent, and then adding the dispersion to the raw resin material in the form of slurry. Further, the apatite powder or slurry may be added in the course of polymerization of raw resin material, and the polymerization may be continued after the addition.

The method for polymerization of resin is not specifically limited and may be a known method.

The identification of apatite in the resin composition of the present invention can be carried out, e.g., by a method involving direct identification on pelletized or molded resin composition using a wide-angle X-ray diffractometry, a method which comprises dipping a pelletized or molded resin composition in a solvent capable of dissolving a resin therein, and then subjecting the residual component to identification by wide-angle X-ray diffractometry, infrared absorption spectrum or the like. In the case of wide-angle X-ray diffractometry, the presence of apatite, if it contains calcium as a metal element, can be confirmed by the presence of peaks attributed to (002), (211) and (300) planes observed at 2θ of about 25.9, 31.7 and 32.6 degrees.

The resin composition of the present invention may have apatite dispersed in the resin on micrometer size level but preferably has apatite uniformly dispersed in the resin on nanometer size level.

In the resin composition of the present invention, apatite is present in the resin in the form of particle having an average diameter or average thickness (d) of not greater than 100 nm and an average aspect ratio (L/d) of not smaller than 5 as defined by the ratio of the average length (L) to said average diameter or average thickness (d).

The confirmation of dispersion of the apatite in the resin and the measurement of the aforementioned average diameter or average thickness (d) and the average length (L) can be carried out by a method which comprises observing a pelletized or molded resin composition under a transmission type electron microscope (TEM).

Explaining in detail, an ultrathin specimen having a thickness of from 20 to 80 nm prepared from a pelletized or molded resin composition is photographed at a magnification power of from 10,000 to 100,000 under a transmission type electron microscope (TEM) to take a light field image on which at least 100 apatite particles are then observed for dispersion to effect determination.

From the light field image thus obtained can be determined the average diameter or average thickness and the average aspect ratio, if apatite particles having a length of Li and a diameter or thickness of di are present in a unit volume by a number of Ni, by the following equations:

Average length $L = \Sigma Li^2 Ni / \Sigma Li Ni$

Average diameter or average thickness $d = \Sigma di^2 Ni / \Sigma di Ni$

Average aspect ratio $L/d = (\Sigma Li^2 Ni / \Sigma Li Ni)/(\Sigma di^2 Ni / \Sigma di Ni)$ The content of apatite in the resin composition of the present invention is preferably from 0.01 to 1,000 parts by weight, more preferably from 0.05 to 500 parts by weight, even more preferably from 0.1 to 300 parts by weight based on 100 parts by weight of the resin. The content of apatite can be determined by measuring a pelletized or molded resin composition for ignition loss (Ig. loss) according to JISR3420 to determine its weight loss. In some detail, the resin composition is thoroughly dried, measured out in an amount of about 1 g on a platinum plate, ashed in an electric furnace at 650±20° C., cooled, and then measured for weight to determine the content of apatite. In order to exert the effect of improving the characteristics of the resin, it is preferred that apatite be incorporated in an amount of at least not smaller than 0.01 parts by weight, more preferably not greater than 1,000 parts by weight Taking into account the moldability, based on 100 parts by weight of the resin.

The resin composition according to the present invention may comprise a moldability improver incorporated therein as necessary so far as the object of the present invention is not impaired. The aforementioned moldability improver is at least one compound selected from the group of compounds consisting of higher aliphatic acid, higher aliphatic ester, higher aliphatic amide compound, polyalkylene glycol, terminal modification product thereof, low molecular polyethylene, oxidized low molecular polyethylene, substituted benzylidene sorbitol, polysiloxane, caprolactone and inorganic crystalline nucleating agent.

The resin composition of the present invention may comprise a deterioration inhibitor incorporated therein for the purpose of inhibiting further heat deterioration and discoloration during heating and improving heat aging resistance and weathering resistance. The aforementioned deterioration inhibitor is at least one compound selected from the group consisting of phenol-based stabilizer such as hindered phenol compound, phosphite-based stabilizer, hindered amine-based stabilizer, triazine-based stabilizer and sulfur-based stabilizer.

The resin composition of the present invention may comprise a coloring agent incorporated therein. The aforementioned coloring agent is at least one coloring agent selected from the group consisting of dye such as nigrosine, pigment such as titanium oxide and carbon black, particulate metal such as aluminum, colored aluminum, nickel, tin, copper, gold, silver, platinum, iron oxide, stainless steel and titanium and metallic pigment such as pearl pigment made of mica, colored graphite, colored glass fiber and colored glass flake.

The resin composition of the present invention may comprise an electrically-conductive carbon black incorporated therein. The aforementioned electrically-conductive carbon black is at least one carbon black selected from the group consisting of acetylene black, Ketjen Black and carbon nanotube. In particular, an electrically-conductive carbon black having a good chain structure and a high agglomeration density is preferred.

The resin composition of the present invention may comprise a fire retardant incorporated therein. The fire retardant is preferably a non-halogenic fire retardant or bromine-based fire retardant.

The aforementioned non-halogenic fire retardant is at least one fire retardant selected from the group consisting of phosphorus-based fire retardant such as red phosphorous, ammonium phosphate and ammonium polyphosphate, metal hydroxide or hydrate of inorganic metal compound such as aluminum hydroxide, magnesium hydroxide, dolomite, hydrotalcite, calcium hydroxide, barium hydroxide, basic magnesium carbonate, zirconium hydroxide, tin oxide, zinc stannate and zinc hydroxystannate, inorganic compound-based fire retardant such as zinc borate, zinc metaborate and barium metaborate, triazine-based fire retardant such as melamine, melam, melem, mellon (product obtained by removal of three ammonia molecules from three melem molecules at 300° C. or higher), melamine cyanurate, melamine phosphate, melamine polyphosphate, succinoguanamine, adipoguanamine, methylglutaroguanamine and melamine resin, and silicone-based fire retardant such as silicone resin, silicone oil and silica.

The aforementioned bromine-based fire retardant is at least one fire retardant selected from the group of compounds consisting of bromated polystyrene, bromated polyphenylene ether, bromated bisphenol type epoxy-based polymer and bromine-based crosslinked aromatic polymer.

The resin composition of the present invention may comprise an inorganic filler incorporated therein. The aforementioned inorganic filler is at least one inorganic filler selected from the group consisting of glass fiber, carbon fiber, wollastonite, talc, kaolin, barium sulfate, calcium carbonate, apatite, sodium phosphate, fluorite, silicon nitride, potassium titanate and molybdenum disulfide.

The resin composition of the present invention is excellent in various moldabilities and thus can be fairly molded even by a known molding method such as commonly known plastic molding method, e.g., press molding, injection molding, gas-assisted injection molding, weld molding, extrusion molding, spray molding, film forming, blow molding, multi-layer molding, expansion molding and melt spinning.

The resin composition of the present invention exhibits a high strength, rigidity and heat resistance and excellent toughness, percent retention of weld strength, dimensional characteristics, external surface appearance and reworkability and thus can be expected to be applied to various parts in the art of general-purpose consumers' products such as packaging material and vessel, automobile, electricity, electronics, machine industry, office machine, aviation, space, etc.

EXAMPLE

The present invention will be illustrated in greater detail with reference to the following Examples, but the invention should not be construed as being limited thereto. Evaluation described in the following Examples and Comparative Examples was conducted in the following manner.

(1) Number-average Molecular Weight (Mn)

The number-average molecular weight was determined by gel permission chromatography (GPC). The apparatus used was HLC-8020, produced by TOSOH CORPORATION, the detector used was a differential refractometer (RI), the solvent used was hexafluoroisopropanol (HFIP), and the columns used were two TSKgel-GMHHR-H's and one G1000HHR, produced by TOSOH CORPORATION. The solvent flow rate was 0.6 ml/min, and the sample concentration was from 1 to 3 (mg sample)/l (ml solvent). The sample was filtered through a filter to remove insoluble contents. Thus, a specimen was obtained. On the basis of the elution curve thus obtained, number-average molecular weight (Mn) was calculated in methyl polymethacrylate (PMMA) equivalence.

(2) Content of Apatite (Parts by Weight/100 Parts by Weight of Thermoplastic Resin)

The resin composition was dried at 100±20° C. for 8 hours, and then cooled. 1 g of the resin composition thus dried was measured out in a platinum plate, ashed in an electric furnace at 650±20° C., cooled, and then measured for weight to determine the content of apatite.

(3) Molar Ratio (Ca/P) and (Ca+X)/P of Calcium or Calcium Plus Metal Other Than Calcium to Phosphorus in Raw Material, Apatite Raw Material Solution or Apatite The raw material, apatite raw material solution or apatite was quantitatively determined for calcium, metal other than calcium and phosphorus to calculate the molar ratio thereof. By way of example, a method for quantitatively determining calcium and phosphorus will be described. Metals other than calcium were quantitatively determined by wavelength characteristic to the metals used.

(3-1) Quantitative Determination of Calcium:

0.5 g of the raw material, apatite raw material solution or apatite was measured out in a platinum plate, and then ashed in a 50° C. electric furnace. After cooling, to the material were added 5 ml of hydrochloric acid and 5 ml of purified water. The mixture was then boiled over a heater to make solution. The solution was then again cooled. To the solution was then added purified water to make 500 ml. Using IRIS/IP (produced by Thermo Jarrel Ash) as a measuring instrument, the solution was then subjected to quantitative determination at a wavelength of 317.933 nm by a high frequency inductively coupled plasma (ICP) emission spectroscope analysis.

(3-2) Quantitative Determination of Phosphorus:

0.5 g of the raw material, apatite raw material solution or apatite was measured out. To the sample thus measured out was then added 20 ml of concentrated sulfuric acid. The mixture was then subjected to wet decomposition over a heater. After cooling, to the material was added 5 ml of hydrogen peroxide. The mixture was then heated and concentrated over a heater until the total volume thereof reached 2 to 3 ml. The material was then again cooled. To the material was then added purified water to make 500 ml. Using IRIS/IP (produced by Thermo Jarrel Ash) as a measuring instrument, the solution was then subjected to quantitative determination at a wavelength of 213.618 nm by a high frequency inductively coupled plasma (ICP) emission spectroscope analysis.

(4) Wide-angle X-ray Diffractometry

The measurement conditions are as follows:

X-ray: Copper Kα
Wavenumber: 0.1542 nm
Tube voltage: 40 KV
Tube current: 200 mA
Scanning speed: 4 deg./min
Divergent slit: 1 deg.
Scattering slit: 1 deg.
Receiving slit: 0.15 mm (5) Observation Under Transmission Electron Microscope (TEM)

Using a cryomicrotome produced by Reichert-Nissei, an ultrathin specimen having a thickness of about 50 nm was prepared from a molded product. The observation under a transmission electron microscope (TEM) was carried out by taking a light field image of the specimen at a magnification power of 50,000 using HF-2000 produced by Hitachi Ltd. From the light field image, 100 particles were arbitrarily selected to determine the average diameter or average thickness or the average aspect ratio of apatite.

(6) Physical Properties of Resin Composition

Using an injection molding machine (PS40E, produced by Nissei Plastic Industrial Co., Ltd.), a molded product to be evaluated for physical properties was prepared.

(6-1) Flexural Modulus (Gpa) and Flexural Strength (Mpa)

These properties were evaluated according to ASTM D790.

(6-2) Tensile Strength (Mpa) and Tensile Elongation (%)

These properties were evaluated according to ASTM D638.

(6-3) Notched Izod Impact Strength (J/m)

These properties were evaluated according to ASTM D256.

(6-4) Deflection Temperature Under Load

These properties were evaluated according to ASTM D648.

(6-5) External Surface Appearance

Using a Type IG320 handy glossmeter, produced by HORIBA, Ltd., 60° gloss was measured according to JIS K7150.

(6-6) Linear Expansion Coefficient

Using TMA-7, produced by Perkin-Elmer, linear expansion coefficient was measured at a temperature rising rate of 5.00° C./min over a temperature range of from −23° C. to 80° C.

(6-7) Reworkability

A molded product (initial molded product) was ground by a grinder. The ground product thus obtained was then molded. This procedure was then repeated four times. The finally obtained molded product (reworked product) was then measured for tensile strength. The percent retention of tensile strength represented by (tensile strength of reworked product)/(tensile strength of initial molded product) was then used for comparison.

Production Example 1 of Acicular Apatite (Production Example a-1)

300.0 g (1.70 mols) of calcium acetate monohydrate and 186.0 g (1.02 mols) of triethyl phosphate were mixed with 1,000 ml of distilled water at a temperature of 40° C. to prepare a raw material solution. This raw material solution was a uniform solution having raw materials dissolved in a solvent. Thereafter, the raw material solution was put in a 5 L autoclave having an agitator in which the air within was then replaced thoroughly by nitrogen with stirring at 250 rpm. The raw material solution was then heated to 220° C. The pressure during this procedure was 2.5 MPa. This state was then kept for 4 hours to effect hydrothermal synthesis. Thereafter, heating was suspended. The solution was allowed to cool to room temperature. The agitator was suspended. The white suspension was then withdrawn. The white suspension thus was repeatedly subjected to cleaning by filtration with water by a sufficient number of times, and then dried at 80° C. to obtain a white powder. The results of the evaluations are set forth in Table 1.

(Production Example a-2)

To 105.2 g (1.05 mols) of light calcium carbonate having an average particle diameter of 100 nm were added 200 ml of distilled water and 2.5 g of ammonium polyacrylate as a dispersant to prepare a stable suspension. The aforementioned suspension of calcium carbonate and 114.8 g (0.63 mols) of triethyl phosphate were mixed with 1,800 ml of distilled water at 40° C. to prepare a raw material solution. This raw material solution was white. The subsequent procedure was conducted in the same manner as in Production Example a-1. The results of the evaluations are set forth in Table 1.

(Production Example a-3)

49.8 g (0.498 mols) of calcium carbonate, 54.4 g (0.299 mols) of triethyl phosphate and 145.6 g (0.996 mols) of adipic acid were mixed with 2,000 ml of distilled water at 40° C. or lower to prepare a raw material solution. This raw material solution was a white suspension. The subsequent procedure was conducted in the same manner as in Production Example a-1. The results of the evaluations are set forth in Table 1.

(Production Example b-2)

150.4 g (0.874 mols) of calcium monohydrogenphosphate dihydrate, 14.7 g (0.085 mols) of magnesium phosphate dibasic trihydrate, 33.6 g (0.336 mols) of calcium carbonate and 11.2 g (0.144 mols) of calcium fluoride were mixed with 2,000 ml of distilled water at a temperature of 40° C. or lower to prepare a raw material solution. The subsequent procedure was conducted in the same manner as in Production Example b-1. The results of the evaluations are set forth in Table 2.

TABLE 1

|  | Unit | Production Example a-1 | Production Example a-2 | Production Example a-3 |
|---|---|---|---|---|
| 1. Composition of raw material solution |  |  |  |  |
| (A) Calcium compound having a phosphorus to calcium molar ratio (P/Ca) of not greater than 0.1 |  |  |  |  |
| 1) Kind |  | $Ca(CH_3COO)_2 \cdot H_2O$ | $CaCO_3$ | a) $CaCO_3$ |
| 2) Added amount | Parts by weight | 30 | 5.26 | a) 2.49 |
| (B) Phosphoric acid or phosphorus acid ester compound |  |  |  |  |
| 1) Kind |  | Triethyl phosphate | Triethyl phosphate | Triethyl phosphate |
| 2) Added amount | Parts by weight | 18.6 | 5.24 | 2.72 |
| (C) Solvent |  |  |  |  |
| 1) Kind |  | Water | Water | Water |
| 2) Added amount | Parts by weight | 100 | 100 | 100 |
| Other additives |  |  |  |  |
| 1) Kind |  | — | — | Adipic acid |
| 2) Added amount | Parts by weight | — | — | 72.8 |
| Ca/P of raw material solution | Molar ratio | 1.67 | 1.67 | 1.67 |
| 2. Hydrothermal synthesis conditions |  |  |  |  |
| 1) Temperature | ° C. | 220 | 220 | 220 |
| 2) Pressure | MPa | 2.5 | 2.5 | 2.5 |
| 3. Yield of apatite | % | 100 | 90 | 95 |
| 4. Characteristics of particulate apatite |  |  |  |  |
| 1) Average diameter (d) | nm | 30 | 95 | 25 |
| 2) Average aspect ratio (L/d) |  | 15 | 7 | 24 |
| 3) Ca/P | Molar ratio | 1.67 | 1.63 | 1.63 |

Production Example 2 of Acicular Apatite (Production Example b-1)

171.1 g (0.994 mols) of calcium monohydrogenphosphate dihydrate, 14.6 g (0.084 mols) of magnesium phosphate dibasic trihydrate, 21.6 g (0.216 mols) of calcium carbonate and 11.2 g (0.144 mols) of calcium fluoride were mixed with 2,000 ml of distilled water at a temperature of 40° C. or lower to prepare a raw material solution. Thereafter, the raw material solution was put in a 5 L autoclave having an agitator in which the air within was then replaced thoroughly by nitrogen with stirring at 250 rpm. The raw material solution was then heated to 250° C. The pressure during this procedure was 4.0 MPa. This state was then kept for 5 hours to effect hydrothermal synthesis. Thereafter, heating was suspended. The solution was allowed to cool to room temperature. The agitator was suspended. The white suspension was then withdrawn. The white suspension thus obtained was repeatedly subjected to cleaning by filtration with water by a sufficient number of times, and then dried at 80° C. to obtain a white powder. The results of the evaluations are set forth in Table 2.

(Production Example b-3)

129.3 g (0.752 mols) of calcium monohydrogenphosphate dihydrate, 4.4 g (0.025 mols) of magnesium phosphate dibasic trihydrate, 12.8 g (0.128 mols) of calcium carbonate and 10.0 g (0.128 mols) of calcium fluoride were mixed with 2,000 ml of distilled water at a temperature of 40° C. or lower to prepare a raw material solution. The subsequent procedure was conducted in the same manner as in Production Example b-1. The results of the evaluations are set forth in Table 2.

(Production Example b-4)

139.7 g (1.259 mols) of calcium chloride, 124.5 g (1.080 mols) of 85% phosphoric acid, 6.7 g (0.35 mols) of copper iodide and 11.2 g (0.144 mols) of calcium fluoride were mixed with 2,000 ml of distilled water at a temperature of 40° C. or lower to prepare a raw material solution. The subsequent procedure was conducted in the same manner as in Production Example b-1. The results of the evaluations are set forth in Table 2.

TABLE 2

| | Unit | Production Example b-1 | Production Example b-2 | Production Example b-3 | Production Example b-4 |
|---|---|---|---|---|---|
| 1. Composition of raw material solution (D) Either or both of a calcium phosphate compound and other phosphorus compounds and optionally a calcium compound | | | | | |
| 1) Kind | | a) $CaHPO_4 \cdot 2H_2O$ b) $CaCO_3$ | a) $CaHPO_4 \cdot 2H_2O$ b) $CaCO_3$ | a) $CaHPO_4 \cdot 2H_2O$ b) $CaCO_3$ | a) $CaCl_2$ b) $H_3PO_4$ |
| 2) Added amount | Parts by weight | a) 8.56 b) 1.08 | a) 7.52 b) 1.68 | a) 6.47 b) 0.64 | a) 6.99 b) 5.29 |
| (E) Metal compound other than calcium | | | | | |
| 1) Kind | | $MgHPO_4 \cdot 3H_2O$ | $MgHPO_4 \cdot 3H_2O$ | $MgHPO_4 \cdot 3H_2O$ | CuI |
| 2) Added amount | Parts by weight | 0.73 | 0.74 | 0.22 | 0.34 |
| (F) Fluorine compound | | | | | |
| 1) Kind | | $CaF_2$ | $CaF_2$ | $CaF_2$ | $CaF_2$ |
| 2) Added amount | Parts by weight | 0.56 | 0.56 | 0.50 | 0.56 |
| (C) Solvent | | | | | |
| 1) Kind | | $H_2O$ | $H_2O$ | $H_2O$ | $H_2O$ |
| 2) Added amount | Parts by weight | 100 | 100 | 100 | 100 |
| (Ca + X)/P of raw material (X is a metal other than calcium) | Molar ratio | 1.33 | 1.50 | 1.33 | 1.33 |
| Ca/X of raw material (X is a metal other than calcium) | Molar ratio | 16.0 | 16.0 | 40.0 | 40.0 |
| (Ca + X)/F of raw material (X is a metal other than calcium) | Molar ratio | 5.0 | 5.0 | 4.0 | 4.0 |
| 2. Hydrothermal synthesis conditions | | | | | |
| 1) Temperature | °C. | 250 | 250 | 250 | 250 |
| 2) Pressure | MPa | 4.0 | 4.0 | 4.0 | 4.0 |
| 3. Yield of apatite | % | 100 | 100 | 100 | 85 |
| 4. Characteristics of particulate apatite | | | | | |
| 1) Average particle diameter | nm | 55 | 65 | 45 | 70 |
| 2) Average aspect ratio (L/d) | | 22 | 15 | 19 | 12 |
| 3) (Ca + X)/P (X is a metal other than calcium) | Molar ratio | 1.60 | 1.57 | 1.66 | 1.59 |

Production Example of Octacalcium Phosphate Compound (Production Example c-1)

240.0 g (1.395 mols) of calcium hydrogenphosphate dihydrate and 46.6 g (0.466 mols) of calcium carbonate were added to 8,000 ml of distilled water. This suspension was heated to 50° C. with stirring at 300 rpm, and this state was then kept for 8 hours. Thereafter, stirring and heating were suspended. The white suspension was repeatedly subjected to cleaning by filtration with distilled water by a sufficient number of times, and then dried at 40° C. to obtain an octacalcium phosphate powder (1). The results of the evaluations are set forth in Table 3.

(Production Example c-2)

80.0 g (0.258 mols) of tricalcium α-phosphate was added to 4,000 ml of a 0.25 M aqueous solution of sodium acetate. This suspension was heated to 50° C. with stirring at 300 rpm, and this state was then kept for 8 hours. Thereafter, stirring and heating were suspended. The white suspension was repeatedly subjected to cleaning by filtration with distilled water by a sufficient number of times, and then dried at 40° C. to obtain an octacalcium phosphate powder (2). The results of the evaluations are set forth in Table 3.

TABLE 3

| | Unit | Production Example c-1 | Production Example c-2 |
|---|---|---|---|
| 1. Composition of raw material | | | |
| 1) Kind | | a) $CaHPO_4 \cdot 2H_2O$ b) $CaCO_3$ | $\alpha$-$Ca_3(PO_4)_2$ |
| 2) Added amount | Parts by weight | a) 3.0 b) 0.58 | 2.0 |
| Solvent | | | |
| 1) Kind | | $H_2O$ | $H_2O$ |
| 2) Added amount | Parts by weight | 100 | 100 |
| 2. Synthesis conditions | | | |
| 1) Temperature | °C. | 50 | 50 |

TABLE 3-continued

|  | Unit | Production Example c-1 | Production Example c-2 |
|---|---|---|---|
| 2) Pressure | MPa | Atmospheric | Atmospheric |
| 3) Reaction time | h | 8 | 8 |
| 3. Yield of octacalcium phosphate | % | 98 | 92 |
| 4. Characteristics of particulate octacalcium phosphate |  |  |  |
| 1) Average thickness (d) | nm | 35 | 45 |
| 2) Average aspect ratio (L/d) |  | 33 | 27 |
| 3) Ca/P of product | Molar ratio | 1.33 | 1.33 |

Production Example of Tabular Apatite (Production Example d-1)

100.0 g of the octacalcium phosphate compound (1) obtained in Production Example c-1 was added to 2,000 ml of distilled water. This suspension was heated to 60° C. with stirring at 300 rpm, and this state was then kept for 8 hours. Thereafter, stirring and heating were suspended. The white suspension was repeatedly subjected to cleaning by filtration with distilled water by a sufficient number of times, and then dried at 80° C. to obtain a white powder. The results of the evaluations are set forth in Table 4.

(Production Example d-2)

The procedure of Production Example d-1 was followed except that the octacalcium phosphate compound powder (2) obtained in Production Example c-2 was used. The results of the evaluations are set forth in Table 4.

(Production Example d-3)

100.0 g of the octacalcium phosphate compound powder (1) obtained in Production Example c-1 was added to 2,000 ml of distilled water to prepare a raw material solution. Thereafter, the raw material solution was put in a 5 L autoclave having an agitator in which the air within was then replaced thoroughly by nitrogen with stirring at 250 rpm. The raw material solution was then heated to 220° C. The pressure during this procedure was 2.5 MPa. This state was then kept for 2 hours to effect hydrothermal synthesis. Thereafter, heating was suspended. The solution was allowed to cool to room temperature. The agitator was suspended. The white suspension was then withdrawn. The white suspension thus obtained was repeatedly subjected to cleaning by filtration with distilled water by a sufficient number of times, and then dried at 80° C. to obtain a white powder. The results of the evaluations are set forth in Table 4.

(Production Example d-4)

100.0 g of the octacalcium phosphate compound powder (1) obtained in Production Example c-1 and 5.0 g (19.1 mmol) of an equimolecular salt of hexamethylenediamine with adipic acid were added to 2,000 ml of distilled water. The subsequent procedure was then conducted in the same manner as in Production Example d-1 to obtain a white powder having at least one of hexamethylenediamine and adipic acid attached thereto. The results of the evaluations are set forth in Table 4.

(Production Example d-5)

100.0 g of the octacalcium phosphate compound powder (1) obtained in Production Example c-1 was put in a crucible which was then kept in an oxygen atmosphere in a 180° C. oven for 1 hour. Thereafter, the product was ground in an agate mortar. The results of the evaluations are set forth in Table 4.

TABLE 4

|  | Unit | Production Example d-1 | Production Example d-2 | Production Example d-3 | Production Example d-4 | Production Example d-5 |
|---|---|---|---|---|---|---|
| 1. Octacalcium phosphate |  |  |  |  |  |  |
| 1) Kind |  | (1) | (2) | (1) | (1) | (1) |
| 2) Added amount | Parts by weight | 5 | 5 | 5 | 5 | — |
| Solvent |  |  |  |  |  |  |
| 1) Kind |  | $H_2O$ | $H_2O$ | $H_2O$ | $H_2O$ | — |
| 2) Added amount | Parts by weight | 100 | 100 | 100 | 100 | — |
| 2. Synthesis conditions |  |  |  |  |  |  |
| 1) Temperature | ° C. | 60 | 60 | 220 | 60 | 180 |
| 2) Pressure | MPa | Atmospheric | Atmospheric | 2.5 | Atmospheric | Atmospheric |
| 3) Reaction time | h | 8 | 8 | 2 | 8 | 1 |
| 3. Yield of apatite | % | 95 | 95 | 90 | 95 | 98 |
| 4. Characteristics of apatite |  |  |  |  |  |  |
| 1) Average thickness (d) | nm | 35 | 44 | 47 | 44 | 45 |
| 2) Average aspect ratio (L/d) |  | 32 | 25 | 28 | 30 | 32 |
| 3) Ca/P of product | Molar ratio | 1.59 | 1.60 | 1.61 | 1.57 | 1.41 |

Example 1

100 parts by weight of a polyamide 66 (Leona (registered trade mark) 1300, produced by Asahi Kasei Corporation) were mixed with 10 parts by weight of the acicular patite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Example 2

100 parts by weight of a polyamide 66 (Leona (registered trade mark) 1300, produced by Asahi Kasei Corporation) were mixed with 10 parts by weight of the acicular patite (a-3) of Production Example a-3. The mixture was then subjected to melt kneading using a twin-screw extruder (TEM35, produced by TOSHIBA MACHINE CO., LTD.) to obtain a resin composition. The results of the evaluatons of the resin composition thus obtained are set forth in Table 5.

Example 3

100 parts by weight of a polyamide 66 (Leona (registered trade mark) 1300, produced by Asahi Kasei Corporation) were mixed with 10 parts by weight of the acicular apatite (b-3) of Production Example b-3. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Example 4

100 parts by weight of a polyamide 66 (Leona (registered trade mark) 1300, produced by Asahi Kasei Corporation) were mixed with 50 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Example 5

100 parts by weight of a polyamide 66 (Leona (registered trade mark) 1300, produced by Asahi Kasei Corporation) were mixed with 100 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Example 6

100 parts by weight of a polyamide 66 (Leona (registered trade mark) 1300, produced by Asahi Kasei Corporation) were mixed with 10 parts by weight of the tabular apatite (d-1) of Production Example d-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Example 7

100 parts by weight of a polyamide 66 (Leona (registered trade mark) 1300, produced by Asahi Kasei Corporation) were mixed with 10 parts by weight of the tabular apatite (d-4) of Production Example d-4. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Example 8

100 parts by weight of a polyamide 66 (Leona (registered trade mark) 1300, produced by Asahi Kasei Corporation) were mixed with 10 parts by weight of the tabular apatite (d-5) of Production Example d-5. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Example 9

100 parts by weight of a polyamide 66 (Leona (registered trade mark) 1300, produced by Asahi Kasei Corporation) were mixed with 50 parts by weight of the tabular apatite (d-1) of Production Example d-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Example 10

100 parts by weight of a polyamide 66 (Leona (registered trade mark) 1300, produced by Asahi Kasei Corporation) were mixed with 10 parts by weight of the tabular apatite (d-1) of Production Example d-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Example 11

100 parts by weight of a polyamide 66 (Leona (registered trade mark) 1300, produced by Asahi Kasei Corporation) were mixed with 10 parts by weight of the octacalcium phosphate (c-1) of Production Example c-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

Comparative Example 1

The polyamide 66 (Leona (registered trade mark) 1300, produced by Asahi Kasei Corporation) used in Examples 1 to 11 was evaluated. The results of the evaluations are set forth in Table 5.

Comparative Example 2

100 parts by weight of a polyamide 66 (Leona (registered trade mark) 1300, produced by Asahi Kasei Corporation)

were mixed with 10 parts by weight of a hydroxyapatite HAP-200 (hexagonal prism crystal having an average diameter of 0.4 μm and an average length of 2 μm) produced by TAIHEI CHEMICAL INDUSTRIAL CO., LTD. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 5.

being discharged out of the system such that the pressure in the autoclave reaches 18 Kg/cm$^2$ but not beyond 18 Kg/cm$^2$ as calculated in terms of gauge pressure. Thereafter, when the inner temperature reached 270° C., the pressure was then reduced to the atmospheric pressure in 1 hour while water was being discharged out of the system. Thereafter, heating was suspended. The polymer was discharged in the form of strand from the lower nozzle, cooled with water, and then cut

TABLE 5

|  |  | Example Nos. | | | | | | | | | | | Comparative Example Nos. | |
| --- | --- | --- | --- | --- | --- | --- | --- | --- | --- | --- | --- | --- | --- | --- |
|  | Unit | 1 | 2 | 3 | 4 | 5 | 6 | 7 | 8 | 9 | 10 | 11 | 1 | 2 |
| 1. Resin |  |  |  |  |  |  |  |  |  |  |  |  |  |  |
| 1) Kind |  | PA66 | PA66 | PA66 | PA66 | PA66 | PA66 | PA66 | PA66 | PA66 | PA66 | PA66 | PA66 | PA66 |
| 2) Added amount | Parts by weight | 100 | 100 | 100 | 100 | 100 | 100 | 100 | 100 | 100 | 100 | 100 | 100 | 100 |
| 2. Additive inorganic material |  |  |  |  |  |  |  |  |  |  |  |  |  |  |
| 1) Kind |  | a-1 | a-3 | b-3 | a-1 | a-1 | d-1 | d-4 | d-5 | d-1 | d-1 | c-1 | — | *1 |
| 2) Added amount (based on 100 parts by weight of resin) | Parts by weight | 10 | 10 | 10 | 50 | 100 | 10 | 10 | 10 | 50 | 100 | 10 | — | 10 |
| 3) Average diameter or thickness (d) | nm | 30 | 25 | 45 | 30 | 30 | 35 | 44 | 45 | 35 | 35 | 35 | — | 400 |
| 4) Average aspect ratio (L/d) |  | 15 | 24 | 19 | 15 | 15 | 32 | 30 | 32 | 32 | 32 | 33 | — | 5 |
| 3. Characteristics of resin |  |  |  |  |  |  |  |  |  |  |  |  |  |  |
| Apatite content (based on 100 parts by weight of resin) |  | 10 | 10 | 10 | 50 | 100 | 10 | 10 | 10 | 50 | 100 | 9.7 | — | 10 |
| Average diameter or thickness (d) of apatite in resin | nm | 30 | 25 | 45 | 30 | 30 | 35 | 43 | 42 | 35 | 34 | 33 | — | 390 |
| Average aspect ratio (L/d) of apatite in resin |  | 15 | 24 | 18 | 15 | 15 | 30 | 28 | 30 | 29 | 26 | 29 | — | 3 |
| 1) Flexural modulus | GPa | 4.15 | 4.25 | 4.20 | 5.50 | 6.50 | 4.30 | 4.25 | 4.30 | 5.57 | 6.55 | 4.20 | 2.75 | 3.65 |
| 2) Flexural strength | MPa | 158 | 162 | 160 | 175 | 214 | 160 | 165 | 157 | 178 | 215 | 161 | 118 | 140 |
| 3) Tensile strength | MPa | 92 | 94 | 90 | 100 | 120 | 90 | 96 | 89 | 110 | 220 | 97 | 79 | 65 |
| 4) Tensile elongation | % | 17 | 17 | 16 | 10 | 7 | 15 | 17 | 14 | 11 | 6 | 17 | 25 | 4 |
| 5) Notched Izod | (J/m) | 60 | 60 | 60 | 82 | 95 | 60 | 62 | 60 | 55 | 50 | 62 | 50 | 35 |
| 6) Deflection temperature under load (1.82 MPa) | (° C.) | 130 | 132 | 128 | 240 | 240 | 130 | 132 | 130 | 240 | 240 | 135 | 75 | 80 |
| 7) External surface appearance (60° gloss) |  | 90 | 90 | 90 | 85 | 80 | 80 | 80 | 80 | 75 | 70 | 90 | 93 | 65 |
| 8) Linear expansion coefficient direction of injection flow | (×10$^{-5}$) | 5.2 | 5.0 | 5.4 | 4.2 | 3.0 | 5.0 | 5.0 | 5.0 | 3.5 | 3.0 | 4.8 | 8.4 | 7.0 |
| 9) Reworkability: retention of tensile strength | % | 97 | 97 | 97 | 95 | 93 | 90 | 90 | 90 | 88 | 85 | 90 | 98 | 75 |

PA66 (Leona (registered trade mark) 1300, produced by Asahi Kasei Corporation)
*1: Product of TAIHEI CHEMICAL INDUSTRIAL CO., LTD.

Example 12

100 parts by weight of a polyamide 6 (SF1013A, produced by UBE INDUSTRIES, LTD.) were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 6.

Example 13

Production of Polyamide 612

20 Kg of an equimolecular solid salt of hexamethylenediamine with dodecanic acid and 20 Kg of purified water were charged in a 70 L autoclave in which they were then thoroughly stirred. The air in the autoclave was thoroughly replaced by nitrogen, and the temperature thereof was then raised from room temperature to 220° C. During this procedure, heating was continued for 1 hour while water was to obtain a polyamide 612. The polyamide 612 exhibited ηr of 2.15 as determined by sulfuric acid dissolution relative viscosity method.

100 parts by weight of the aforementioned polyamide 612 were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 6.

Example 14

Production of Polyamide 66/Polyamide 6I 10.5 Kg of an equimolecular salt of hexamethylenediamine with adipic acid, 4.5 Kg of an equimolecular salt of hexamethylenediamine with isophthalic acid and 20 Kg of purified water were charged in a 70 L autoclave in which they were then thoroughly stirred. The subsequent procedure was conducted in the same manner as in the process for the production of polyamide of Example 13 to obtain a polyamide 66/polyamide 6I. The polyamide 66/polyamide 6I exhibited a number-average molecular weight of 10,500 as determined by GPC.

100 parts by weight of the aforementioned polyamide 66/polyamide 6I were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 6.

Example 15

Production of Polyamide 66/Polyamide 6

12 Kg of an equimolecular salt of hexamethylenediamine with adipic acid, 1.2 Kg of ε-caprolactam and 20 Kg of purified water were charged in a 70 L autoclave in which they were then thoroughly stirred. The subsequent procedure was conducted in the same manner as in the process for the production of polyamide of Example 13 to obtain a polyamide 66/polyamide 6. The polyamide 66/polyamide 6 exhibited a number-average molecular weight of 13,000 as determined by GPC.

100 parts by weight of the aforementioned polyamide 66/polyamide 6 were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 6.

Example 16

Production of Polyamide 66/Polyamide 6/Polyamide 6I

12 Kg of an equimolecular salt of hexamethylenediamine with adipic acid, 0.75 Kg of ε-caprolactam, 2.25 Kg of an equimolecular salt of hexamethylenediamine with isophthalic acid and 20 Kg of purified water were charged in a 70 L autoclave in which they were then thoroughly stirred. The subsequent procedure was conducted in the same manner as in Example 13 to obtain a polyamide 66/polyamide 6/polyamide 6I. The polyamide 66/polyamide 6/polyamide 6I exhibited a number-average molecular weight of 12,500 as determined by GPC.

100 parts by weight of the aforementioned polyamide 66/polyamide 6/polyamide 6I were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 6.

Comparative Example 3

The polyamide 6 (SF1013A, produced by UBE INDUSTRIES, LTD.) used in Example 12 was evaluated. The results of the evaluations are set forth in Table 6.

Comparative Example 4

The polyamide 612 synthesized in Example 13 was evaluated. The results of the evaluations are set forth in Table 6.

Comparative Example 5

The polyamide 66/polymaide 6I synthesized in Example 14 was evaluated. The results of the evaluations are set forth in Table 6.

Comparative Example 6

The polyamide 66/polymaide 6 synthesized in Example 15 was evaluated. The results of the evaluations are set forth in Table 6.

Comparative Example 7

The polyamide 66/polymaide 6/polyamide 6I synthesized in Example 16 was evaluated. The results of the evaluations are set forth in Table 6.

TABLE 6

| | | Example Nos. | | | | | Comparative Example Nos. | | | | |
|---|---|---|---|---|---|---|---|---|---|---|---|
| | Unit | 12 | 13 | 14 | 15 | 16 | 3 | 4 | 5 | 6 | 7 |
| 1. Resin | | | | | | | | | | | |
| 1) Kind | | PA6 | PA612 | PA66/ PA6I | PA66/ PA6 | PA66/ PA6/ PA6I | PA6 | PA612 | PA66/ PA6I | PA66/ PA6 | PA66/ PA6/ PA6I |
| 2) Added amount | Parts by weight | 100 | 100 | 100 | 100 | 100 | 100 | 100 | 100 | 100 | 100 |
| 2. Additive inorganic material | | | | | | | | | | | |
| 1) Kind | | a-1 | a-1 | a-1 | a-1 | a-1 | | | | | |
| 2) Added amount (based on 100 parts by weight of resin) | Parts by weight | 10 | 10 | 10 | 10 | 10 | 0 | 0 | 0 | 0 | 0 |
| 3) Average diameter or thickness (d) | nm | 30 | 30 | 30 | 30 | 30 | | | | | |
| 4) Average aspect ratio (L/d) | | 15 | 15 | 15 | 15 | 15 | | | | | |
| 3. Characteristics of resin | | | | | | | | | | | |
| Apatite content (based on 100 parts by weight of resin) | | 10 | 10 | 10 | 10 | 10 | 0 | 0 | 0 | 0 | 0 |
| Average diameter or thickness (d) of apatite in resin | nm | 30 | 30 | 30 | 30 | 30 | | | | | |
| Average aspect ratio (L/d) of apatite in resin | | 15 | 15 | 15 | 15 | 15 | | | | | |

TABLE 6-continued

|  | Unit | Example Nos. | | | | | Comparative Example Nos. | | | | |
| --- | --- | --- | --- | --- | --- | --- | --- | --- | --- | --- | --- |
|  |  | 12 | 13 | 14 | 15 | 16 | 3 | 4 | 5 | 6 | 7 |
| 1) Flexural modulus | GPa | 3.90 | 3.30 | 3.80 | 3.85 | 4.00 | 2.50 | 1.75 | 3.15 | 2.50 | 2.70 |
| 2) Tensile strength | MPa | 88 | 86 | 90 | 88 | 95 | 73 | 56 | 90 | 75 | 80 |
| 3) Tensile elongation | % | 25 | 23 | 10 | 20 | 11 | 200 | 26 | 20 | 25 | 24 |
| 4) Notched Izod | (J/m) | 59 | 45 | 40 | 43 | 40 | 56 | 35 | 50 | 50 | 45 |

PA6 (SF1013A, produced by UBE INDUSTRIES, LTD.)

Example 17

100 parts by weight of a polyphenylene ether (Xyron (registered trade mark) 500H, produced by Asahi Kasei Corporation) were mixed with 10 parts by weight of the acicular patite (a-1) of Production Example a-1. The mixture was then subjected to melt kneading using a twin-screw extruder (TEM35, produced by TOSHIBA MACHINE CO., LTD.) was obtain a resin composition. The results of the evaluations of the resin composition thus obtained are set forth in Table 7.

Example 18

100 parts by weight of a polyoxymethylene (Tenac (registered trade mark) C4520, produced by Asahi Kasei Corporation) were mixed with 10 parts by weight of the acicular patite (a-1) of Production Example a-1. The mixture was then subjected to melt kneading using a twin-screw extruder (TEM35, produced by TOSHIBA MACHINE CO., LTD.) was obtain a resin composition. The results of the evaluations of the resin composition thus obtained are set forth in Table 7.

Example 19

100 parts by weight of a polybutylene terephthalate (Traycon (registered trade mark) 1401-X34, produced by Toray Industries, Ltd.) were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Example 20

100 parts by weight of an aromatic polycarbonate (Iupilon (registered trade mark) S2000, produced by MITSUBISHI CHEMICAL CORPORATION) were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Example 21

100 parts by weight of a polyphenylene sulfide (Ryton (registered trade mark) M2588, produced by Toray Industries, Ltd.) were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Example 22

100 parts by weight of a polypropylene (PM671A, produced by Montel SDK Sunrise Co., Ltd.) were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Example 23

100 parts by weight of a polystyrene (HIPS: Stylon (registered trade mark) 470A, produced by M&A Styrene Co., Ltd.) were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Example 24

100 parts by weight of a methacrylic resin (Delpet (registered trade mark) SR6500, produced by Asahi Kasei Corporation) were mixed with 10 parts by weight of the acicular apatite (a-1) of Production Example a-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Example 25

100 parts by weight of a polyphenylene ether (Xyron (registered trade mark) 500H, produced by Asahi Kasei Corporation) were mixed with 10 parts by weight of the tabular apatite (d-1) of Production Example d-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Example 26

100 parts by weight of a polyoxymethylene (Tenac (registered trade mark) C4520, produced by Asahi Kasei Corporation) were mixed with 10 parts by weight of the tabular apatite (d-1) of Production Example d-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Example 27

100 parts by weight of a polybutylene terephthalate (Traycon (registered trade mark) 1401-X34, produced by Toray Industries, Ltd.) were mixed with 10 parts by weight of the tabular apatite (d-1) of Production Example d-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Example 28

100 parts by weight of a polytrimethyl terephthalate (CP-BR, produced by Shell Inc.) were mixed with 10 parts by weight of the tabular apatite (d-1) of Production Example d-1. The mixture was then subjected to melt kneading using a twin-screw extruder (TEM35, produced by TOSHIBA MACHINE CO., LTD.) to obtain a resin composition. The results of the evaluations of the resin composition thus obtained are set forth in Table 7.

Comparative Example 8

The polyphenylene ether used in Examples 17 and 25 was evaluated. The results of the evaluations of this resin are set forth in Table 8.

Comparative Example 9

The polyoxymethylene used in Examples 18 and 26 was evaluated. The results of the evaluations of this resin are set forth in Table 8.

Comparative Example 10

The polybutylene terephthalate used in Examples 19 and 27 was evaluated. The results of the evaluations of this resin are set forth in Table 8.

Comparative Example 11

The aromatic polycarbonate used in Example 20 was evaluated. The results of the evaluations of this resin are set forth in Table 8.

Comparative Example 12

The polyphenylene sulfide used in Example 21 was evaluated. The results of the evaluations of this resin are set forth in Table 8.

Comparative Example 13

The polypropylene used in Example 22 was evaluated. The results of the evaluations of this resin are set forth in Table 8.

Comparative Example 14

The polystyrene used in Example 23 was evaluated. The results of the evaluations of this resin are set forth in Table 8.

Comparative Example 15

The methacrylic resin used in Example 24 was evaluated. The results of the evaluations of this resin are set forth in Table 8.

Comparative Example 16

The polytrimethyl terephthalate used in Example 28 was evaluated. The results of the evaluations of this resin are set forth in Table 8.

TABLE 7

| | | Example Nos. | | | | | | | | | | |
|---|---|---|---|---|---|---|---|---|---|---|---|---|
| | Unit | 17 | 18 | 19 | 20 | 21 | 22 | 23 | 24 | 25 | 26 | 27 | 28 |
| 1. Resin | | | | | | | | | | | | | |
| 1) Kind | | PPE | POM | PBT | PC | PPS | PP | PS | Methacrylic resin | PPE | POM | PBT | PTT |
| 2) Added amount | Parts by weight | 100 | 100 | 100 | 100 | 100 | 100 | 100 | 100 | 100 | 100 | 100 | 100 |
| 2. Additive inorganic material | | | | | | | | | | | | | |
| 1) Kind | | a-1 | a-1 | a-1 | a-1 | a-1 | a-1 | a-1 | a-1 | d-1 | d-1 | d-1 | d-1 |
| 2) Added amount (based on 100 parts by weight of resin) | Parts by weight | 10 | 10 | 10 | 10 | 10 | 10 | 10 | 10 | 10 | 10 | 10 | 10 |
| 3) Average diameter or thickness (d) | nm | 30 | 30 | 30 | 30 | 30 | 30 | 30 | 30 | 35 | 35 | 35 | 35 |
| 4) Average aspect ratio (L/d) | | 15 | 15 | 15 | 15 | 15 | 15 | 15 | 15 | 32 | 32 | 32 | 32 |
| 3. Characteristics of resin | | | | | | | | | | | | | |
| Apatite content (based on 100 parts by weight of resin) | | 10 | 10 | 10 | 10 | 10 | 10 | 10 | 10 | 10 | 10 | 10 | 10 |
| Average diameter or thickness (d) of apatite in resin | nm | 30 | 30 | 30 | 30 | 30 | 30 | 30 | 30 | 35 | 35 | 35 | 35 |
| Average aspect ratio(L/d) of apatite in resin | | 15 | 15 | 15 | 15 | 15 | 15 | 15 | 15 | 30 | 28 | 29 | 30 |
| 1) Flexural modulus | GPa | 3.10 | 3.50 | 3.30 | 3.10 | 4.50 | 2.00 | 3.00 | 2.00 | 3.10 | 3.50 | 3.30 | 3.30 |

TABLE 7-continued

|  | Unit | Example Nos. | | | | | | | | | | | |
|---|---|---|---|---|---|---|---|---|---|---|---|---|
|  |  | 17 | 18 | 19 | 20 | 21 | 22 | 23 | 24 | 25 | 26 | 27 | 28 |
| 2) Tensile strength | MPa | 60 | 70 | 65 | 70 | 95 | 40 | 30 | 40 | 60 | 70 | 65 | 75 |
| 3) Notched Izod | (J/m) | 100 | 50 | 35 | 800 | 20 | 110 | 75 | 67 | 100 | 50 | 35 | 39 |
| 4) Deflection temperature under load (1.82 MPa) | (° C.) | 135 | 125 | 75 | 150 | >260 | — | — | — | 135 | 125 | 75 | 75 |

PPE (Xyron (registered trade mark) 500H, produced by Asahi Kasei Corporation), POM (Tenac (registered trade mark) C4520, produced by Asahi Kasei Corporation), PBT (Traycon (registered trade mark) 1401-X34, produced by Toray Industries, Ltd.), PC (Iupilon (registered trade mark) S2000, produced by MITSUBISHI CHEMICAL CORPORATION), PPS (Ryton (registered trade mark) M2588, produced by Toray Industries, Ltd.), PP (PM671A, produced by Montel SDK Sunrise Co., Ltd.), PS (HIPS: Stylon (registered trade mark) 470A, Produced by M&A Styrene Co., Ltd.), Methacrylic resin (Delpet (registered trade mark) SR6500, produced by Asahi Kasei Corporation), PTT (CP-BR, produced by Shell Inc.)

TABLE 8

|  | Unit | Comparative Example Nos. | | | | | | | | |
|---|---|---|---|---|---|---|---|---|---|---|
|  |  | 8 | 9 | 10 | 11 | 12 | 13 | 14 | 15 | 16 |
| 1. Resin |  |  |  |  |  |  |  |  |  |  |
| 1) Kind |  | PPE | POM | PBT | PC | PPS | PP | PS | Methacrylic resin | PTT |
| 2) Added amount | Parts by weight | 100 | 100 | 100 | 100 | 100 | 100 | 100 | 100 | 100 |
| 2. Characteristics of resin |  |  |  |  |  |  |  |  |  |  |
| 1) Flexural modulus | Gpa | 2.35 | 2.60 | 2.50 | 2.30 | 3.70 | 1.25 | 2.30 | 1.50 | 2.60 |
| 2) Tensile strength | Mpa | 49 | 61 | 54 | 62 | 84 | 30 | 21 | 30 | 64 |
| 3) Notched Izod | (J/m) | 147 | 59 | 39 | 870 | 20 | 120 | 78 | 70 | 39 |
| 4) Deflection temperature under load | (° C.) | 120 | 110 | 60 | 136 | 230 | — | — | — | — |

PPE (Xyron (registered trade mark) 500H, produced by Asahi Kasei Corporation), POM (Tenac (registered trade mark) C4520, produced by Asahi Kasei Corporation), PBT (Traycon (registered trade mark) 1401-X34, produced by Toray Industries, Ltd.), PC (Iupilon (registered trade mark) S2000, produced by MITSUBISHI CHEMICAL CORPORATION), PPS (Ryton (registered trade mark) M2588, produced by Toray Industries, Ltd.), PP (PM671A, produced by Montel SDK Sunrise Co., Ltd.), PS (HIPS: Stylon (registered trade mark) 470A, produced by M&A Styrene Co., Ltd.), Methacrylic resin (Delpet (registered trade mark) SR6500, produced by Asahi Kasei Corporation), PTT (CP-BR, produced by Shell Inc.)

Example 29

1.5 Kg of an equimolecular solid salt of adipic acid with hexamethylenediamine, 1.5 Kg of purified water and 65.0 g of the acicular apatite obtained in Production Example a-1 suspended in 200 g of purified water were charged in a 5 L autoclave in which they were then thoroughly stirred. The air in the autoclave was thoroughly replaced by nitrogen, and the temperature thereof was then raised from room temperature to 220° C. During this procedure, heating was continued for 1 hour while water was being discharged out of the system such that the pressure in the autoclave reaches 18 Kg/cm$^2$ but not beyond 18 Kg/cm$^2$ as calculated in terms of gauge pressure. Thereafter, when the inner temperature reached 270° C., the pressure was then reduced to the atmospheric pressure in 1 hour while water was being discharged out of the system. Thereafter, heating was suspended. The system was then airtightly sealed. The material was then allowed to cool to room temperature. The autoclave was then opened. About 1.5 Kg of the polymer was withdrawn, and then ground by a grinder. The polyamide resin composition thus obtained was then evaluated in the form of ground product and injection molded product. The results of the evaluations of the polyamide resin composition thus obtained are set forth in Table 9.

Example 30

1.5 Kg of an equimolecular solid salt of adipic acid with hexamethylenediamine, 1.5 Kg of purified water and 65.0 g of the acicular apatite obtained in Production Example a-3 suspended in 200 g of purified water were charged in a 5 L autoclave in which they were then thoroughly stirred. The subsequent procedure was then conducted in the same manner as in Example 29. The results of the evaluations are set forth in Table 9.

Example 31

In the present example, the synthesis of acicular apatite by production process a-3 was conducted, directly followed by the polymerization of polyamide.

Two 5 L autoclaves equipped with an agitator were disposed vertically adjacent to each other. The bottom of the upper autoclave (a) and the upper portion of the lower autoclave (b) were connected to each other through a pipe provided with a valve to prepare an apparatus by which the present example was then effected.

Firstly, in the autoclave (a), 49.8 g (0.498 mols) of calcium carbonate, 54.4 g (0.299 mols) of triethyl phosphate and 145.6 g (0.996 mols) of adipic acid were mixed with 2,000 ml of distilled water at a temperature of 23° C. to prepare an apatite raw material solution. Thereafter, the air in the autoclave (a) was thoroughly replaced by nitrogen with stirring at 250 rpm. The apatite raw material solution was then heated to 220° C. in airtightly sealed state. During this procedure, the pressure was 2.5 MPa. The apatite raw material solution was kept in this state for 4 hours. In this manner, a slurry containing the same acicular apatite as in production process a-3 was prepared.

On the other hand, in the autoclave (b) had been previously charged 115.7 g (0.996 mols) of hexamethylenediamine and an aqueous solution obtained by dissolving 869 g of an equimolecular solid salt of hexamethylenediamine with adipic acid in 869 ml of 50° C. distilled water as a polyamide raw material. The air in the autoclave (b) was then thoroughly replaced by nitrogen. Pressurized nitrogen was then supplied into the autoclave (b) to increase the pressure to 1.8 MPa. The material was then kept stirred at 250 rpm.

After the completion of hydrothermal synthesis of acicular apatite in the autoclave (a), stirring in the autoclave (a) was suspended. The valve at the connection with the autoclave (b) was slowly opened to move the suspension in the autoclave (a) to the autoclave (b). After the movement of the suspension, the inner temperature of the autoclave (b) was 150° C. The pressure in the autoclave (b) was then reduced to 1.8 MPa as calculated in terms of gauge pressure. Thereafter, the temperature was raised to 270° C. During this procedure, heating was continued for 1 hour while water was being discharged out of the system such that the pressure in the autoclave (b) does not exceed 18 Kg/cm$^2$ as calculated in terms of gauge pressure. Thereafter, the pressure in the autoclave (b) was reduced to the atmospheric pressure in about 1 hour. The polymer was then withdrawn from the bottom nozzle of the autoclave (b) in the form of strand, cooled with water, and then cut to obtain a pelletized material. The pelletized material thus obtained was dried in a stream of 80° C. nitrogen for 24 hours, and then molded to obtain a molded product. The results of measurement of physical properties of the molded product thus obtained are set forth in Table 9.

Example 32

1.5 Kg of an equimolecular solid salt of adipic acid with hexamethylenediamine, 1.5 Kg of purified water and 65.0 g of the tabular apatite obtained in Production Example d-1 suspended in 200 g of purified water were charged in a 5 L autoclave in which they were then thoroughly stirred. The subsequent procedure was then conducted in the same manner as in Example 29. The results of the evaluations are set forth in Table 9.

Example 33

1.5 Kg of an equimolecular solid salt of adipic acid with hexamethylenediamine, 1.5 Kg of purified water and 65.0 g of the tabular apatite obtained in Production Example d-4 suspended in 200 g of purified water were charged in a 5 L autoclave in which they were then thoroughly stirred. The subsequent procedure was then conducted in the same manner as in Example 29. The results of the evaluations are set forth in Table 9.

Example 34

1.5 Kg of an equimolecular solid salt of adipic acid with hexamethylenediamine, 1.5 Kg of purified water and 65.0 g of the octacalcium phosphate obtained in Production Example c-1 suspended in 200 g of purified water were charged in a 5 L autoclave in which they were then thoroughly stirred. The subsequent procedure was then conducted in the same manner as in Example 29. The results of the evaluations are set forth in Table 9.

Comparative Example 17

1.5 Kg of an equimolecular solid salt of adipic acid with hexamethylenediamine, 1.5 Kg of purified water and 65.0 g of a hydroxyapatite HAP-200 (hexagonal prism crystal having an average diameter of 0.4 µm and an average length of 2 µm) produced by TAIHEI CHEMICAL INDUSTRIAL CO., LTD. suspended in 200 g of purified water were charged in a 5 L autoclave in which they were then thoroughly stirred. The subsequent procedure was then conducted in the same manner as in Example 24. The results of the evaluations are set forth in Table 9.

TABLE 9

| | | Example Nos. | | | | | | Comparative Example No. |
|---|---|---|---|---|---|---|---|---|
| | Unit | 29 | 30 | 31 | 32 | 33 | 34 | 17 |
| 1. Resin material | | | | | | | | |
| 1) Kind | | PA66 | PA66 | PA66 | PA66 | PA66 | PA66 | PA66 |
| 2) Added amount | Parts by weight | 100 | 100 | 100 | 100 | 100 | 100 | 100 |
| 2. Additive inorganic material | | | | | | | | |
| 1) Kind | | a-1 | a-3 | a-3 | d-1 | d-4 | c-1 | *1 |
| 2) Added amount (based on 100 parts by weight of resin) | Parts by weight | 4.3 | 4.3 | 4.6 | 4.3 | 4.3 | 4.3 | 4.3 |
| 3) Average diameter or thickness (d) | nm | 30 | 25 | 25 | 35 | 44 | 35 | 200 |
| 4) Average aspect ratio (L/d) | | 15 | 24 | 24 | 32 | 30 | 33 | 5 |
| 3. Characteristics of resin composition | | | | | | | | |
| Number-average molecular weight (Mn) of resin | | 13,500 | 13,000 | 13,100 | 12,700 | 13,700 | 12,500 | 13,000 |
| Apatite content (based on 100 parts by weight of resin) | parts by weight | 5 | 5 | 5 | 5 | 5 | 5 | 5 |
| Average diameter or thickness (d) of apatite in resin | nm | 30 | 25 | 25 | 34 | 42 | 31 | 395 |
| Average aspect ratio (L/d) of apatite in resin | | 15 | 24 | 24 | 30 | 29 | 29 | 5 |
| 1) Flexural modulus | GPa | 3.45 | 3.50 | 3.55 | 3.63 | 3.62 | 3.60 | 3.40 |
| 2) Flexural strength | MPa | 132 | 136 | 137 | 136 | 137 | 138 | 130 |
| 3) Tensile strength | MPa | 88 | 90 | 92 | 85 | 88 | 92 | 65 |
| 4) Tensile elongation | % | 18 | 17 | 17 | 14 | 16 | 17 | 8 |

TABLE 9-continued

|  | Unit | Example Nos. | | | | | | Comparative Example No. |
|---|---|---|---|---|---|---|---|---|
|  |  | 29 | 30 | 31 | 32 | 33 | 34 | 17 |
| 5) Notched Izod | (J/m) | 55 | 54 | 55 | 50 | 55 | 55 | 35 |
| 6) Deflection temperature under load (1.82 MPa) | (° C.) | 95 | 94 | 95 | 95 | 95 | 95 | 85 |
| 7) External surface appearance (60° gloss) |  | 90 | 90 | 90 | 90 | 90 | 90 | 75 |
| 8) Linear expansion coefficient: direction of injection flow | (×10$^{-5}$) | 5.5 | 5.2 | 5.0 | 5.2 | 5.1 | 5.1 | 7.8 |
| 9) Reworkability: retention of tensile strength | % | 97 | 98 | 98 | 90 | 89 | 90 | 75 |

*1 Product of TAIHEI CHEMICAL INDUSTRIAL CO., LTD.

Example 35

1.5 Kg of an equimolecular solid salt of adipic acid with hexamethylenediamine, 1.5 Kg of purified water, 85.7 g of calcium monohydrogenphosphate dihydrate (CaHPO$_4$.2H$_2$O), 7.4 g of magnesium phosphate dibasic trihydrate (MgHPO$_4$.3H$_2$O), 10.8 g of calcium carbonate (CaCO$_3$) suspended in 200 g of purified water, 5.6 g of calcium fluoride (CaF$_2$), and 5.7 g of hexamethylenediamine as a part of raw material for adjusting the molecular weight were charged in a 5 L autoclave in which they were then thoroughly stirred. The air in the autoclave was thoroughly replaced by nitrogen, and the temperature thereof was then raised from room temperature to 220° C. During this procedure, heating was continued for 1 hour while water was being discharged out of the system such that the pressure in the autoclave reaches 18 Kg/cm$^2$ but not beyond 18 Kg/cm$^2$ as calculated in terms of gauge pressure. Thereafter, when the inner temperature reached 270° C., the pressure was then reduced to the atmospheric pressure in 1 hour while water was being discharged out of the system. Thereafter, heating was suspended. The system was then airtightly sealed. The material was then allowed to cool to room temperature. The autoclave was then opened. About 1.5 Kg of the polymer was withdrawn, and then ground by a grinder. The polyamide resin composition thus obtained was then evaluated in the form of ground product and injection molded product. The results of the evaluations of the polyamide resin composition thus obtained are set forth in Tables 10 and 11.

Example 36

1.5 Kg of an equimolecular solid salt of adipic acid with hexamethylenediamine, 1.5 Kg of purified water, 84.8 g of calcium monohydrogenphosphate dihydrate (CaHPO$_4$.2H$_2$O), 8.4 g of magnesium phosphate dibasic trihydrate (MgHPO$_4$.3H$_2$O), 18.9 g of calcium carbonate (CaCO$_3$) suspended in 200 g of purified water, 6.3 g of calcium fluoride (CaF$_2$), and 5.7 g of hexamethylenediamine as a part of raw material for adjusting the molecular weight were charged in a 5 L autoclave in which they were then thoroughly stirred. The subsequent procedure was then conducted in the same manner as in Example 35. The results of the evaluations are set forth in Tables 10 and 11.

Example 37

1.5 Kg of an equimolecular solid salt of adipic acid with hexamethylenediamine, 1.5 Kg of purified water, 171.2 g of calcium monohydrogenphosphate dihydrate (CaHPO$_4$.2H$_2$O), 14.7 g of magnesium phosphate dibasic trihydrate (MgHPO$_4$.3H$_2$O), 21.6 g of calcium carbonate (CaCO$_3$) suspended in 200 g of purified water, 11.2 g of calcium fluoride (CaF$_2$), and 5.7 g of hexamethylenediamine as a part of raw material for adjusting the molecular weight were charged in a 5 L autoclave in which they were then thoroughly stirred. The subsequent procedure was then conducted in the same manner as in Example 35. The results of the evaluations are set forth in Tables 10 and 11.

Example 38

1.5 Kg of an equimolecular solid salt of adipic acid with hexamethylenediamine, 1.5 Kg of purified water, 85.7 g of calcium monohydrogenphosphate dihydrate (CaHPO$_4$.2H$_2$O), 7.4 g of magnesium phosphate dibasic trihydrate (MgHPO$_4$.3H$_2$O), 10.8 g of calcium carbonate (CaCO$_3$) suspended in 200 g of purified water, 5.6 g of calcium fluoride (CaF$_2$), and 5.7 g of hexamethylenediamine as a part of raw material for adjusting the molecular weight were charged in a 5 L autoclave. The air in the autoclave was thoroughly replaced by nitrogen. The mixture was heated to 80° C. where it was then thoroughly stirred for 0.5 hours. The subsequent procedure was then conducted in the same manner as in Example 35. The results of the evaluations are set forth in Tables 10 and 11.

Example 39

1.5 Kg of an equimolecular solid salt of adipic acid with hexamethylenediamine, 1.5 Kg of purified water, 85.7 g of calcium monohydrogenphosphate dihydrate (CaHPO$_4$.2H$_2$O), 7.4 g of magnesium phosphate dibasic trihydrate (MgHPO$_4$.3H$_2$O), 10.8 g of calcium carbonate (CaCO$_3$) suspended in 200 g of purified water, 5.6 g of calcium fluoride (CaF$_2$), and 5.7 g of hexamethylenediamine as a part of raw material for adjusting the molecular weight were charged in a 5 L autoclave. The air in the autoclave was thoroughly replaced by nitrogen. The mixture was heated to 150° C. where it was then thoroughly stirred for 1 hour. The subsequent procedure was then conducted in the same manner as in Example 35. The results of the evaluations are set forth in Tables 10 and 11.

Example 40

1.5 Kg of an equimolecular solid salt of adipic acid with hexamethylenediamine, 1.5 Kg of purified water, 75.0 g of calcium monohydrogenphosphate dihydrate (CaHPO$_4$.2H$_2$O), 6.8 g of iron chloride (FeCl$_2$.4H$_2$O), 5.3 g of calcium carbonate (CaCO$_3$) suspended in 200 g of purified water and 4.5 g of calcium fluoride (CaF$_2$) were charged in a 5 L autoclave. The air in the autoclave was thoroughly replaced by nitrogen. The mixture was heated to 150° C. where it was then thoroughly stirred for 1 hour. The subsequent procedure was then conducted in the same manner as in Example 35. The results of the evaluations are set forth in Tables 10 and 11.

Example 41

1.5 Kg of an equimolecular solid salt of adipic acid with hexamethylenediamine, 1.5 Kg of purified water, 75.0 g of calcium monohydrogenphosphate dihydrate ($CaHPO_4 \cdot 2H_2O$), 7.7 g of copper bromide ($CuBr_2$), 5.3 g of calcium carbonate ($CaCO_3$) suspended in 200 g of purified water and 4.5 g of calcium fluoride ($CaF_2$) were charged in a 5 L autoclave. The air in the autoclave was thoroughly replaced by nitrogen. The mixture was heated to 150° C. where it was then thoroughly stirred for 1 hour. The subsequent procedure was then conducted in the same manner as in Example 35. The results of the evaluations are set forth in Tables 10 and 11.

Example 42

1.05 Kg of an equimolecular solid salt of hexamethylenediamine with adipic acid, 1.5 Kg of purified water, 85.7 g of calcium monohydrogenphosphate dihydrate ($CaHPO_4 \cdot 2H_2O$), 7.4 g of magnesium phosphate dibasic trihydrate ($MgHPO_4 \cdot 3H_2O$), 10.8 g of calcium carbonate ($CaCO_3$) suspended in 200 g of purified water, 5.6 g of calcium fluoride ($CaF_2$), and 5.7 g of hexamethylenediamine as a part of raw material for adjusting the molecular weight were charged in a 5 L autoclave. The subsequent procedure was then conducted in the same manner as in Example 35. The results of the evaluations are set forth in Tables 10 and 11.

Example 43

1.2 Kg of an equimolecular solid salt of hexamethylenediamine with adipic acid, 0.12 Kg of ε-caprolactam, 1.5 Kg of purified water, 85.7 g of calcium monohydrogenphosphate dihydrate ($CaHPO_4 \cdot 2H_2O$), 7.4 g of magnesium phosphate dibasic trihydrate ($MgHPO_4 \cdot 3H_2O$), 10.8 g of calcium carbonate ($CaCO_3$) suspended in 200 g of purified water, 5.6 g of calcium fluoride ($CaF_2$), and 5.7 g of hexamethylenediamine as a part of raw material for adjusting the molecular weight were charged in a 5 L autoclave in which they were then thoroughly stirred. The subsequent procedure was then conducted in the same manner as in Example 35. The results of the evaluations are set forth in Tables 10 and 11.

Comparative Example 18

1.5 Kg of an equimolecular solid salt of adipic acid with hexamethylenediamine, 1.5 Kg of purified water, 75.0 g of calcium monohydrogenphosphate dihydrate ($CaHPO_4 \cdot 2H_2O$) and 29.0 g of calcium carbonate ($CaCO_3$) suspended in 200 g of purified water were charged in a 5 L autoclave in which they were then thoroughly stirred. The subsequent procedure was then conducted in the same manner as in Example 35. The results of the evaluations are set forth in Tables 10 and 11.

TABLE 10

| | Unit | Example Nos. | | | | |
|---|---|---|---|---|---|---|
| | | 35 | 36 | 37 | 38 | 39 |
| 1. Composition of raw material solution | | | | | | |
| 1) Apatite material | | a) $CaHPO_4 \cdot 2H_2O$ b) $CaCO_3$ c) $CaF_2$ d) $MgHPO_4 \cdot 3H_2O$ | a) $CaHPO_4 \cdot 2H_2O$ b) $CaCO_3$ c) $CaF_2$ d) $MgHPO_4 \cdot 3H_2O$ | a) $CaHPO_4 \cdot 2H_2O$ b) $CaCO_3$ c) $CaF_2$ d) $MgHPO_4 \cdot 3H_2O$ | a) $CaHPO_4 \cdot 2H_2O$ b) $CaCO_3$ c) $CaF_2$ d) $MgHPO_4 \cdot 3H_2O$ | a) $CaHPO_4 \cdot 2H_2O$ b) $CaCO_3$ c) $CaF_2$ d) $MgHPO_4 \cdot 3H_2O$ |
| 2) Added amount (based 100 parts by weight of resin material) | Parts by weight | a) 5.71 b) 0.72 c) 0.37 d) 0.49 | a) 5.65 b) 1.26 c) 0.42 d) 0.56 | a) 11.4 b) 1.44 c) 0.74 d) 0.98 | a) 5.71 b) 0.72 c) 0.37 d) 0.49 | a) 5.71 b) 0.72 c) 0.37 d) 0.49 |
| (Ca + X)/P of raw material (X is metal other than calcium) | Molar ratio | 1.33 | 1.50 | 1.33 | 1.33 | 1.33 |
| Ca/X of raw material (X is metal other than calcium) | Molar ratio | 16.0 | 16.0 | 16.0 | 16.0 | 16.0 |
| 2. Resin material | | | | | | |
| 1) Kind | | PA66 | PA66 | PA66 | PA66 | PA66 |
| 2) Added amount | | 100 | 100 | 100 | 100 | 100 |

| | Example Nos. | | | | Comparative |
|---|---|---|---|---|---|
| | 40 | 41 | 42 | 43 | Example 18 |
| 1. Composition of raw material solution | | | | | |
| 1) Apatite material | a) $CaHPO_4 \cdot 2H_2O$ b) $CaCO_3$ c) $CaF_2$ | a) $CaHPO_4 \cdot 2H_2O$ b) $CaCO_3$ c) $CaF_2$ | a) $CaHPO_4 \cdot 2H_2O$ b) $CaCO_3$ C) $CaF_2$ | a) $CaHPO_4 \cdot 2H_2O$ b) $CaCO_3$ c) $CaF_2$ | a) $CaHPO_4 \cdot 2H_2O$ b) $CaCO_3$ |

TABLE 10-continued

|  | d) FeCl$_2$·4H$_2$O | d) CuBr | d) MgHPO$_4$·3H$_2$O | d) MgHPO$_4$·3H$_2$O |  |
|---|---|---|---|---|---|
| 2) Added amount (based 100 parts by weight of resin material) | a) 5.00<br>b) 0.35<br>c) 0.30<br>d) 0.45 | a) 5.00<br>b) 0.35<br>c) 0.30<br>d) 0.51 | a) 5.71<br>b) 0.72<br>c) 0.37<br>d) 0.49 | a) 5.71<br>b) 0.72<br>c) 0.37<br>d) 0.49 | a) 5.00<br>b) 1.93 |
| (Ca + X)/P of raw material (X is metal other than calcium) | 1.33 | 1.33 | 1.33 | 1.33 | 1.67 |
| Ca/X of raw material (X is metal other than calcium) | 16.0 | 16.0 | 16.0 | 16.0 | — |
| 2. Resin material |  |  |  |  |  |
| 1) Kind | PA66 | PA66 | PA66/PA6I | PA66/PA6 | PA66 |
| 2) Added amount | 100 | 100 | 100 | 100 | 100 |

TABLE 11

|  |  | Example Nos. |  |  |  |  |  |  |  |  | Comp. Example No. |
|---|---|---|---|---|---|---|---|---|---|---|---|
|  | Unit | 35 | 36 | 37 | 38 | 39 | 40 | 41 | 42 | 43 | 18 |
| 3. Characteristics of resin composition |  |  |  |  |  |  |  |  |  |  |  |
| Number-average molecular weight (Mn) of resin |  | 13,700 | 14,100 | 13,300 | 14,500 | 14,500 | 12,100 | 11,900 | 12,500 | 13,000 | 14,900 |
| Apatite content (based on 100 parts by weight of resin) | Parts by weight | 5.5 | 5.4 | 10.4 | 5.5 | 5.5 | 5.5 | 5.4 | 5.3 | 5.4 | 5.1 |
| Characteristics of particulate apatite |  |  |  |  |  |  |  |  |  |  |  |
| Average diameter or thickness (d) of apatite in resin | nm | 20 | 50 | 24 | 17 | 14 | 22 | 20 | 23 | 21 | 55 |
| Average aspect ratio (L/d) of apatite in resin |  | 16 | 11 | 15 | 17 | 18 | 13 | 14 | 13 | 15 | 1.5 |
| (Ca + X)/P (in which X is metal other than calcium) | Molar ratio | 1.60 | 1.63 | 1.57 | 1.63 | 1.64 | 1.59 | 1.61 | 1.63 | 1.61 | 1.67 |
| 1) Flexural modulus | GPa | 3.73 | 3.63 | 4.45 | 3.73 | 3.75 | 3.50 | 3.46 | 3.65 | 3.6 | 3.30 |
| 2) Flexural strength | MPa | 140 | 135 | 165 | 142 | 145 | 135 | 133 | 133 | 134 | 125 |
| 3) Tensile strength | MPa | 88 | 86 | 93 | 90 | 93 | 90 | 90 | 90 | 90 | 83 |
| 4) Tensile elongation | % | 19 | 16 | 15 | 16 | 16 | 15 | 15 | 12 | 19 | 18 |
| 5) Notched Izod | (J/m) | 54 | 51 | 55 | 55 | 55 | 50 | 50 | 45 | 55 | 50 |
| 6) Deflection temperature under load (1.82 MPa) | (° C.) | 95 | 90 | 130 | 95 | 96 | 89 | 88 | 90 | 89 | 85 |
| 7) External surface appearance (60° gloss) |  | 90 | 90 | 90 | 90 | 90 | 90 | 90 | 95 | 95 | 90 |
| 8) Linear expansion coefficient: direction of injection flow | (×10$^{-5}$) | 5.8 | 6.1 | 5.0 | 5.8 | 5.7 | 6.0 | 6.2 | 6.0 | 6.2 | 7.5 |
| 9) Reworkability: retention of tensile strength | % | 97 | 96 | 95 | 97 | 97 | 95 | 95 | 95 | 96 | 97 |

Example 44

Production of Polyphenylene Ether to be Used:

In a 10 L reaction bath having an oxygen blowing port at the bottom thereof and a temperature-controlling jacket were charged 7.67 kg of toluene, 2.19 kg of 2,6-dimethylphenol, 2.8 g of copper oxide, 10.8 g of a 47 wt-% aqueous solution of hydrogen bromide, 84 g of butyl dimethylamine, 33 g of dibutylamine and 7 g of di-t-teat-butylethylenediamine. With the temperature controlled to 40° C., the mixture was then bubbled with oxygen with stirring to initiate polymerization. After 2 hours, the polymer solution which had become viscous was withdrawn, added dropwise to methanol to undergo recrystallization, and then filtered. The resulting solid material was washed with methanol, withdrawn by filtration, and then dried in vacuo at 140° C. for 2 hours to obtain a polyphenylene ether in the form of white powder. This powder exhibited a reduced viscosity of 0.52 as determined at 30° C. in chloroform solution (0.5 g/dl)

Production of Polyamide/Polyphenylene Ether Alloy Product:

30 parts by weight of the polyphenylene ether thus synthesized, 0.15 parts by weight of maleic anhydride (Crystal MAN (produced by NOF CORPORATION), hereinafter abbreviated as "MAH" ) as a compatibilizer and 7 parts by weight of a hydrogenated styrene-butadiene copolymer (Kraton (registered trade mark)(produced by Shell Inc.), hereinafter abbreviated as "HTR" ) as an impact-resistant reinforcement were supplied into a co-rotating twin-screw extruder having a supply port upstream and downstream (ZSK-40: produced by Werner & Pfleiderer Corp.: Germany) with its cylinder temperature adjusted to a range of from 280° C. to 320° C. at the upstream supply port. At the same time, 64 parts by weight of the polyamide obtained in Example 36 were supplied into the co-rotating twin-screw extruder at the downstream supply port. These materials were subjected to melt kneading at a screw rotary speed of 300 rpm to obtain a resin composition. The results of the evaluations are set forth in Table 12.

The evaluation of coating was conducted in the following manner.

The resin composition thus obtained was subjected to injection molding for an injection time of 17 seconds and a cooling time of 20 seconds with the mold temperature of the molding machine (FN3000, produced by Nissei Plastic Industrial Co., Ltd.) to obtain a tabular molded product having a length of 90 mm, a width of 60 mm and a thickness of 3 mm to be evaluated for coating.

The coating on the tabular molded product was conducted according to the method described in JP-A-60-65035. In some detail, an epoxy-based coating compound diluted with a dedicated thinner was applied to the tabular molded product by a spray gun. The tabular molded product thus coated was allowed to stand at room temperature for 30 minutes, and then subjected to heat curing at 150° C. for 30 minutes.

For the evaluation of coat adhesion, the aforementioned coated tabular molded product was subjected to 1 mm square grid test according to JIS K5400-1979. The number of grids left unpeeled per 100 grids was then determined. For the evaluation of external appearance of coat, the external appearance of surface of coat was visually observed. The results of judgment are represented as follows.

A: Good external appearance;
B: Partly poor external appearance;
C: Much poor external appearance The results of the evaluations are set forth in Table 12.

Comparative Example 19

The procedure of Example 44 was followed except that as the polyamide there was used a polyamide 66 (Leona (registered trade mark) 1300, produced by Asahi Kasei Corporation). The results of the evaluations are set forth in Table 12.

In the case where an unreinforced polyamide 66 is merely alloyed with a polyphenylene ether as in the present comparative example, the resulting product exhibits an excellent impact resistance but a low dimensional stability and hence a great dimensional change after molding, e.g., when molded into a large-sized product such as automobile exterior plate, occasionally causing troubles during the step of assembly of automobile body. Further, the resin composition of the present comparative example has a poor coat adhesion and thus needs to be subjected to some surface treatment that adds to cost.

Comparative Example 20

The procedure of Example 44 was followed except that as the polyamide there was used the polyamide prepared in Comparative Example 17. The results of the evaluations are set forth in Table 12.

In the case where a polyamide having apatite having an insufficient average aspect ratio and a great average diameter dispersed therein is alloyed with a polyphenylene ether as in the present comparative example, no sufficient enhancement or improvement can be made in strength, rigidity, dimensional stability, etc.

Comparative Example 21

Production of Polyamide to be Used:

100 parts by weight of a polyamide 66 (Leona (registered trade mark) 1300, produced by Asahi Kasei Corporation) were mixed with 5 parts by weight of a swelling fluoromica (MAE-100, produced by Coop Chemical Co., Ltd.). The mixture was then subjected to melt kneading using a twin-screw extruder (TEM35, produced by TOSHIBA MACHINE CO., LTD.) to obtain a polyamide resin composition.

Production of Polyamide/Polyphenylene Ether Alloy Product:

A polyamide/polyphenylene ether resin composition was obtained in the same manner as in Example 44 except that the aforementioned polyamide was used. The results of the evaluations are set forth in Table 12.

In the case where a polyamide having a conventional inorganic filler dispersed therein is alloyed with a polyphenylene ether as in the present comparative example, the resulting resin composition exhibits an improved strength and rigidity and a slightly improved dimensional stability but a drastically deteriorated impact resistance and hence some brittleness particularly when used as a part related to automobile, occasionally causing troubles.

TABLE 12

| Characteristics of resin | Unit | Example 44 | Comparative Example 19 | Comparative Example 20 | Comparative Example 21 |
|---|---|---|---|---|---|
| Amount of filler based on 100 parts by weight of total amount of resin | Parts by weight | 3.2 | 0 | 3.2 | 2.0 |
| Average diameter or thickness (d) of filler in resin | nm | 20 | — | 400 | 1 |
| Average aspect ratio (L/d) of filler in resin | | 16 | — | 5 | 1,000 |

TABLE 12-continued

| Characteristics of resin | Unit | Example 44 | Comparative Example 19 | Comparative Example 20 | Comparative Example 21 |
|---|---|---|---|---|---|
| 1) Flexural modulus | GPa | 2.80 | 2.52 | 2.60 | 3.00 |
| 2) Flexural strength | MPa | 95 | 90 | 90 | 100 |
| 3) Tensile strength | MPa | 65 | 64 | 64 | 65 |
| 4) Tensile elongation | % | 40 | 34 | 35 | 4.6 |
| 5) Notched Izod | (J/m) | 190 | 530 | 180 | 45 |
| 6) Deflection temperature under load (1.82 MPa) | (° C.) | 205 | 205 | 205 | 196 |
| 7) Linear expansion coefficient: direction of injection flow | ($\times 10^{-5}$) | 6.5 | 8.2 | 7.9 | 7.4 |
| Coat adhesion (number of grids left unpeeled) | 100/100 | 97/100 | 0/100 | 0/100 | 0/100 |
| External appearance of coat | | A | A | B | C |

Example 45

100 parts by weight of a polyamide 66 (Leona (registered trade mark) 1300, produced by Asahi Kasei Corporation), 10 parts by weight of the acicular apatite obtained in Production Example a-1 and 15 parts by weight of short glass fiber (JA416, produced by ASAHI FIBER GLASS CO., LTD.) were subjected to melt kneading at a cylinder temperature of 290° C., a rotary speed of 250 rpm and a rate of 40 Kg/h using a twin-screw extruder (TEM35, produced by TOSHIBA MACHINE CO., LTD.) to obtain a resin composition. The acicular apatite and the short glass fiber were supplied through a side feeder. The results of the evaluations of the resin composition thus obtained are set forth in Table 13.

Example 46

A resin composition was obtained in the same manner as in Example 45 except that as the apatite to be added there was used the tabular apatite obtained in Production Example d-1. The results of the evaluations of the resin composition thus obtained are set forth in Table 13.

Example 47

100 parts by weight of the polyamide resin composition obtained in Example 6 having the tabular apatite obtained in Production Example d-1 melt-kneaded therein and 15 parts by weight of short glass fiber (JA416, produced by ASAHI FIBER GLASS CO., LTD.) were subjected to melt kneading at a cylinder temperature of 290° C., a rotary speed of 250 rpm and a rate of 40 Kg/h using a twin-screw extruder (TEM35, produced by TOSHIBA MACHINE CO., LTD.) to obtain a resin composition. The short glass fiber was supplied through a side feeder. The results of the evaluations of the resin composition thus obtained are set forth in Table 13.

Example 48

100 parts by weight of the polyamide 66/polyamide 6I synthesized in Example 14, 10 parts by weight of the tabular apatite obtained in Production Example d-1 and 50 parts by weight of short glass fiber (JA416, produced by ASAHI FIBER GLASS CO., LTD.) were subjected to melt kneading at a cylinder temperature of 290° C., a rotary speed of 250 rpm and a rate of 40 Kg/h using a twin-screw extruder (TEM35, produced by TOSHIBA MACHINE CO., LTD.) to obtain a resin composition. The acicular apatite and the short glass fiber were supplied through a side feeder. The results of the evaluations of the resin composition thus obtained are set forth in Table 13.

Example 49

100 parts by weight of a polyamide 66 (Leona (registered trade mark) 1300, produced by Asahi Kasei Corporation), 10 parts by weight of the acicular apatite obtained in Production Example a-1 and 25 parts by weight of a maleic anhydride-modified rubber component (Tuftec (registered trade mark) M1943, produced by Asahi Kasei Corporation) were subjected to melt kneading at a cylinder temperature of 290° C., a rotary speed of 250 rpm and a rate of 40 Kg/h using a twin-screw extruder (TEM35, produced by TOSHIBA MACHINE CO., LTD.) to obtain a resin composition. The acicular apatite and the rubber component were supplied through a side feeder. The results of the evaluations of the resin composition thus obtained are set forth in Table 13.

Example 50

100 parts by weight of the polyamide resin composition obtained in Example 6 having the acicular apatite obtained in Production Example a-1 melt-kneaded therein and 25 parts by weight of a maleic anhydride-modified rubber component (Tuftec (registered trade mark) M1943, produced by Asahi Kasei Corporation) were subjected to melt kneading at a cylinder temperature of 290° C., a rotary speed of 250 rpm and a rate of 40 Kg/h using a twin-screw extruder (TEM35, produced by TOSHIBA MACHINE CO., LTD.) to obtain a resin composition. The rubber component was supplied through a side feeder. The results of the evaluations of the resin composition thus obtained are set forth in Table 13.

Comparative Example 22

100 parts by weight of a polyamide 66 (Leona (registered trade mark) 1300, produced by Asahi Kasei Corporation) and 15 parts by weight of short glass fiber (JA416, produced by ASAHI FIBER GLASS CO., LTD.) were subjected to melt kneading at a cylinder temperature of 290° C., a rotary speed of 250 rpm and a rate of 40 Kg/h using a twin-screw extruder (TEM35, produced by TOSHIBA MACHINE CO., LTD.) to obtain a resin composition. The short glass fiber was supplied through a side feeder. The results of the evaluations of the resin composition thus obtained are set forth in Table 13.

Comparative Example 23

100 parts by weight of a polyamide 66 (Leona (registered trade mark) 1300, produced by Asahi Kasei Corporation) and 25 parts by weight of a maleic anhydride-modified rubber component (Tuftec (registered trade mark) M1943, produced by Asahi Kasei Corporation) were subjected to melt kneading at a cylinder temperature of 290° C., a rotary speed of 250 rpm and a rate of 40 Kg/h using a twin-screw extruder (TEM35, produced by TOSHIBA MACHINE CO., LTD.) to obtain a resin composition. The rubber component was supplied through a side feeder. The results of the evaluations of the resin composition thus obtained are set forth in Table 13.

ratio (P/Ca) of not greater than 0.1 and (B) a phosphoric acid or phosphorous acid ester compound with (C) water or a solvent comprising at least one selected from the group consisting of hydrophilic organic solvents to prepare a raw material solution, and then subjecting said raw material solution to hydrothermal synthesis at 120° C. or higher under pressure.

TABLE 13

|  | Unit | Example Nos. | | | | | | Comparative Example Nos. | |
|---|---|---|---|---|---|---|---|---|---|
|  |  | 45 | 46 | 47 | 48 | 49 | 50 | 22 | 23 |
| 1. Resin |  |  |  |  |  |  |  |  |  |
| 1) Kind |  | PA66 | PA66 | PA66 | PA66/PA6I | PA66 | PA66 | PA66 | PA66 |
| 2) Added amount | Parts by weight | 100 | 100 | 100 | 100 | 100 | 100 | 100 | 100 |
| 2. Additive inorganic material |  |  |  |  |  |  |  |  |  |
| 1) Kind |  | a-1 | d-1 | d-1 | d-1 | a-1 | a-1 | — | — |
| 2) Added amount (based on 100 parts by weight of resin) |  | 10 | 10 | 10 | 10 | 10 | 10 | — | — |
| 1) Kind |  | GF | GF | GF | GF | Rubber | Rubber | GF | Rubber |
| 2) Added amount (based on 100 parts by weight of resin) | Parts by weight | 15 | 15 | 15 | 50 | 25 | 25 | 15 | 25 |
| 3. Characteristics of resin composition |  |  |  |  |  |  |  |  |  |
| Average diameter or thickness (d) of apatite in resin | nm | 30 | 35 | 32 | 33 | 30 | 30 | — | — |
| Average aspect ratio (L/d) of apatite in resin |  | 15 | 30 | 25 | 30 | 15 | 15 | — | — |
| 1) Flexural modulus | GPa | 5.53 | 5.65 | 5.60 | 15.0 | 2.40 | 2.35 | 4.80 | 2.00 |
| 2) Flexural strength | MPa | 180 | 185 | 183 | 380 | 105 | 100 | 157 | 85 |
| 3) Tensile strength | MPa | 118 | 127 | 120 | 245 | 55 | 49 | 108 | 49 |
| 4) Tensile elongation | % | 2.5 | 2.5 | 2.5 | 2.0 | 20 | 30 | 2.5 | 30 |
| 5) Notched Izod | (J/m) | 50 | 50 | 50 | 130 | 260 | 265 | 49 | 245 |
| 7) External surface appearance (60° gloss) |  | 75 | 87 | 85 | 80 | 80 | 83 | 70 | 75 |

The invention claimed is:

1. An apatite-reinforced resin composition comprising a resin and apatite, wherein said apatite is present in said resin composition thus obtained in a particulate form having an average diameter or average thickness (d) of not greater than 100 nm and an average aspect ratio (L/d) of not smaller than 5 as defined by the ratio of the average length (L) to said average diameter or average thickness (d).

2. The apatite-reinforced resin composition according to claim 1, wherein the resin is at least one thermoplastic resin selected from the group consisting of polyamide resin, polyphenylene ether resin, polyoxymethylene resin, aliphatic polyester resin, aromatic polyester resin, aromatic polycarbonate resin, polyphenylene sulfide resin, polyolefin resin, styrene resin, acryl resin and rubber.

3. The apatite-reinforced resin composition according to claim 1 or 2, wherein the molar ratio (Ca+X)/P of phosphorus (P) and calcium (Ca) plus metals (X) other than calcium, constituting said apatite present in said resin composition is from 1.20 to 1.80.

4. The apatite-reinforced resin composition according to claim 3, wherein the molar ratio Ca/(Ca+X) of calcium (Ca) plus metals (X) other calcium and calcium (Ca), constituting said apatite present in said resin composition is from 0.70 to 1.00 and the molar ratio (Ca+X)/F of fluorine (F) and calcium (Ca) plus metals (X) other calcium, constituting said apatite present in said resin composition is from 5.0 to 1,000.

5. The apatite-reinforced resin composition according to claim 4, wherein the apatite is obtained by mixing (A) a calcium compound having a phosphorus to calcium molar ratio (P/Ca) of not greater than 0.1 and (B) a phosphoric acid or phosphorous acid ester compound with (C) water or a solvent comprising at least one selected from the group consisting of hydrophilic organic solvents to prepare a raw material solution, and then subjecting said raw material solution to hydrothermal synthesis at 120° C. or higher under pressure.

6. The apatite-reinforced resin composition according to claim 4, wherein the apatite is obtained by mixing a raw material comprising (D) a mixture of either or both of a calcium phosphate compound and other phosphorus compounds and optionally a calcium compound (except calcium phosphate), (E) a metal compound comprising a metal other than calcium and (F) a fluorine compound, with (C) water or a solvent comprising at least one selected from the group consisting of hydrophilic organic solvents to prepare a raw material solution, and then subjecting said raw material solution to hydrothermal synthesis.

7. The apatite-reinforced resin composition according to claim 3, wherein the molar ratio Ca/(Ca+X) of calcium (Ca) plus metals (X) other than calcium and calcium (Ca), constituting said apatite present in said resin composition is from 0.80 to 1.00.

8. The apatite-reinforced resin composition according to claim 7, wherein the apatite is obtained by subjecting octacalcium phosphate to heat treatment at 40° C. to 400° C.

9. A process for the production of an apatite-reinforced resin composition comprising a resin and apatite, which process comprises mixing a resin with apatite having an average diameter or average thickness (d) of not greater than 100 nm and an average aspect ratio (L/d) of not smaller than 5 as defined by the ratio of the average length (L) to said average diameter or average thickness (d).

10. A process for the production of an apatite-reinforced resin composition comprising a resin and apatite, which process comprises mixing a resin raw material with apatite having an average diameter or average thickness (d) of not greater than 100 nm and an average aspect ratio (L/d) of not smaller than 5 as defined by the ratio of the average length (L) to said average diameter or average thickness (d), and then subjecting the mixture to polymerization.

11. The process for the production of an apatite-reinforced resin composition according to claim 9 or 10, wherein the apatite to be mixed is obtained by mixing (A) a calcium compound having a phosphorus to calcium molar ratio (P/Ca) of not greater than 0.1 and (B) a phosphoric or phosphorous acid ester compound with (C) water or a solvent comprising at least one selected from the group consisting of hydrophilic organic solvents to prepare a raw material solution, and then subjecting said raw material solution to hydrothermal synthesis at 120° C. or higher under pressure.

12. The process for the production of an apatite-reinforced resin composition according to claim 9 or 10, wherein the apatite to be mixed is obtained by mixing a raw material comprising (D) a mixture of either or both of a calcium phosphate compound and other phosphorus compounds and optionally a calcium compound (except calcium phosphate), (E) a metal compound comprising a metal other than calcium and (F) a fluorine compound, with (C) water or a solvent comprising at least one selected from the group consisting of hydrophilic organic solvents to prepare a raw material solution, and then subjecting said raw material solution to hydrothermal synthesis.

13. The process for the production of an apatite-reinforced resin composition according to claim 9 or 10, wherein the apatite to be mixed is obtained by subjecting octacalcium phosphate to heat treatment at 40° C. to 400° C.

14. A process for the production of an apatite-reinforced resin composition of claim 1, which comprises mixing a resin with a raw material solution obtained by mixing (A) a calcium compound having a phosphorus to calcium molar ratio (P/Ca) of not greater than 0.1 and (B) a phosphoric acid or phosphorous acid ester compound with (C) water or a solvent comprising at least one selected from the group consisting of hydrophilic organic solvents, and then subjecting the mixture to heat treatment while the resin is in molten state.

15. A process for the production of an apatite-reinforced resin composition of claim 1, which comprises subjecting a resin and a raw material solution obtained by mixing (D) a mixture of either or both of a calcium phosphate compound and other phosphorus compounds and optionally a calcium compound (except calcium phosphate), (E) a metal compound comprising a metal other than calcium and (F) a fluorine compound, with (C) water or a solvent comprising at least one selected from the group consisting of hydrophilic organic solvents, to heat treatment while the resin is in molten state.

16. A process for the production of an apatite-reinforced resin composition of claim 1, which comprises mixing a resin with octacalcium phosphate, and then subjecting the mixture to heat treatment at 40° C. to 400° C.

17. A process for the production of an apatite-reinforced resin composition of claim 1, which comprises mixing a raw resin material with a raw material solution obtained by mixing (A) a calcium compound having a phosphorus to calcium molar ratio (P/Ca) of not greater than 0.1 and (B) a phosphoric acid or phosphorous acid ester compound with (C) water or a solvent comprising at least one selected from the group consisting of hydrophilic organic solvents, and then effecting polymerization of the resin and hydrothermal synthesis of apatite at the same time.

18. A process for the production of an apatite-reinforced resin composition of claim 1, which comprises mixing a raw resin material with a raw material solution obtained by mixing (D) a mixture of either or both of a calcium phosphate compound and other phosphorus compounds and optionally a calcium compound (except calcium phosphate), (E) a metal compound comprising a metal other than calcium and (F) a fluorine compound with (C) water or a solvent comprising at least one selected from the group consisting of hydrophilic organic solvents, and then effecting polymerization of the resin and hydrothermal synthesis of apatite at the same time.

19. A process for the production of an apatite-reinforced resin composition of claim 1, which comprises mixing a raw resin material with octacalcium phosphate, and then effecting polymerization of the resin and synthesis of apatite at 40° C. to 400° C. at the same time.

20. The process for the production of an apatite-reinforced resin composition according to claim 16, wherein the octacalcium phosphate has an average thickness (d) of not greater than 100 nm and an average aspect ratio (L/d) of not smaller than 5 as defined by the ratio of the average length (L) to said average thickness (d).

21. The process for the production of an apatite-reinforced resin composition according to claim 19, wherein the octacalcium phosphate has an average thickness (d) of not greater than 100 nm and an average aspect ratio (L/d) of not smaller than 5 as defined by the ratio of the average length (L) to said average thickness (d).

\* \* \* \* \*